United States Patent [19]
Uchimura et al.

[11] Patent Number: 5,602,379
[45] Date of Patent: Feb. 11, 1997

[54] OPTICAL CODE READER

[75] Inventors: Mitsuo Uchimura, Numazu; Masashi Suzuki, Mishima; Yoshinori Akazawa, Amagasaki; Takashi Itoh, Fuji, all of Japan

[73] Assignee: Kabushiki Kaisha TEC, Shizuoka, Japan

[21] Appl. No.: 251,402

[22] Filed: May 31, 1994

[30] Foreign Application Priority Data

| May 31, 1993 | [JP] | Japan | 5-129016 |
| Sep. 28, 1993 | [JP] | Japan | 5-241567 |
| Sep. 28, 1993 | [JP] | Japan | 5-241568 |

[51] Int. Cl.⁶ ............................................. G06K 7/10
[52] U.S. Cl. ................................................ 235/472
[58] Field of Search ................................... 235/472

[56] References Cited

U.S. PATENT DOCUMENTS

| 4,210,802 | 7/1980 | Sakai | 235/472 |
| 4,488,679 | 12/1984 | Bockholt et al. | 235/472 |
| 4,877,949 | 10/1989 | Danielson et al. | 235/462 |
| 5,019,699 | 5/1991 | Koenck | 235/472 |
| 5,210,398 | 5/1993 | Metlitsky | 235/472 |
| 5,308,964 | 5/1994 | Kwon | 235/472 |

FOREIGN PATENT DOCUMENTS

| 0389125A3 | 9/1990 | European Pat. Off. |
| 0524029A2 | 1/1993 | European Pat. Off. |
| 84378 | 3/1992 | Japan | 235/462 |
| 69788 | 3/1992 | Japan | 235/472 |

*Primary Examiner*—John Shepperd
*Attorney, Agent, or Firm*—Frishauf, Holtz, Goodman, Langer & Chick

[57] ABSTRACT

An optical code reader which is held in a hand of an operator and is brought near an article having a 2-dimensional code affixed thereto at the time of reading, includes an illumination light source for illuminating the 2-dimensional code on the article, a reading unit for reading the 2-dimensional code from a light reflected by the article, and a frame for housing the light source and the reading unit, the frame having a read window through which the reflected light passes. The reading unit has an area CCD for sensing an image corresponding to the reflected light and for converting the image to an electrical signal, and a lens block for focusing the reflected light to the area CCD to form the image. The reading unit further has an optical path length adjusting cap for adjusting the length of an optical path between the read window and the lens block upon a change in the magnification of the lens block.

12 Claims, 14 Drawing Sheets

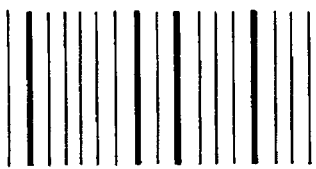
FIG. 1A
(PRIOR ART)
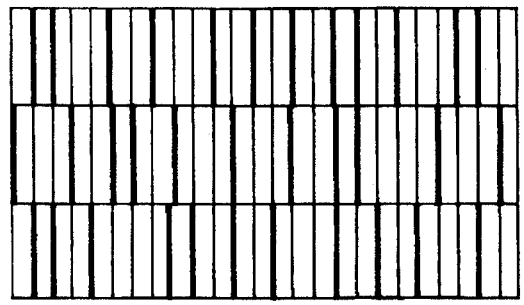
FIG. 1B
(PRIOR ART)
FIG. 1C
(PRIOR ART)
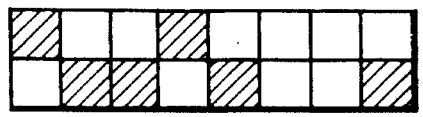
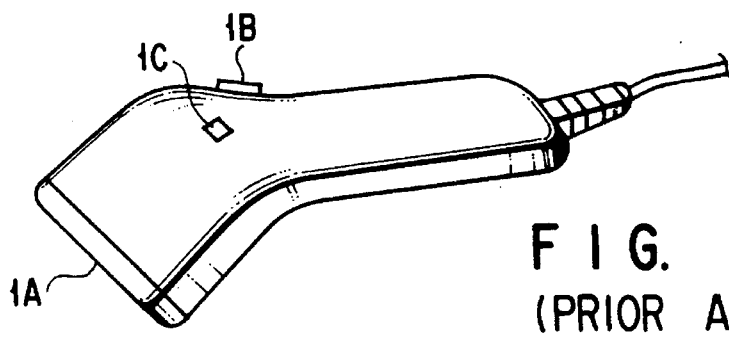
FIG. 2A
(PRIOR ART)
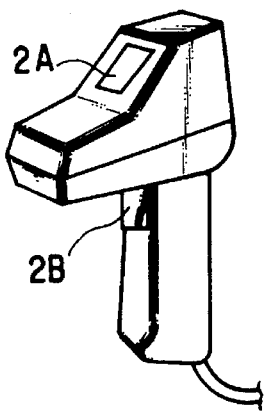
FIG. 2B
(PRIOR ART)
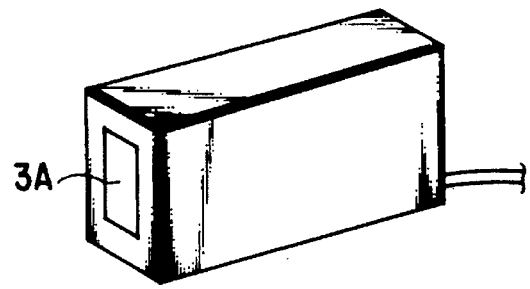
FIG. 2C
(PRIOR ART)

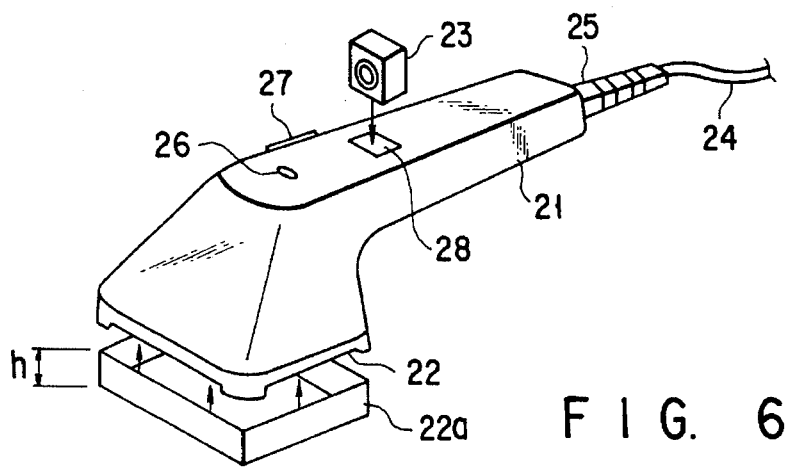
F I G. 6
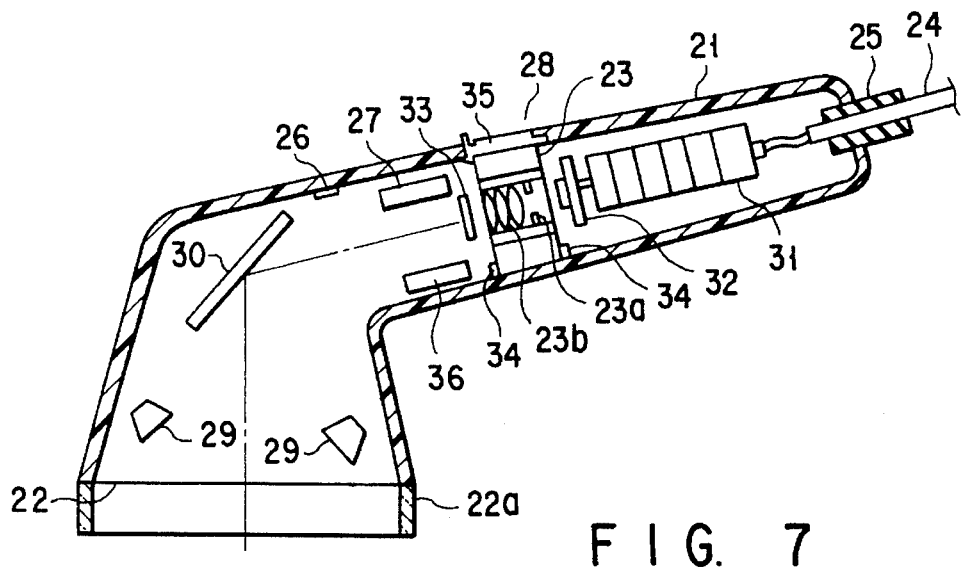
F I G. 7

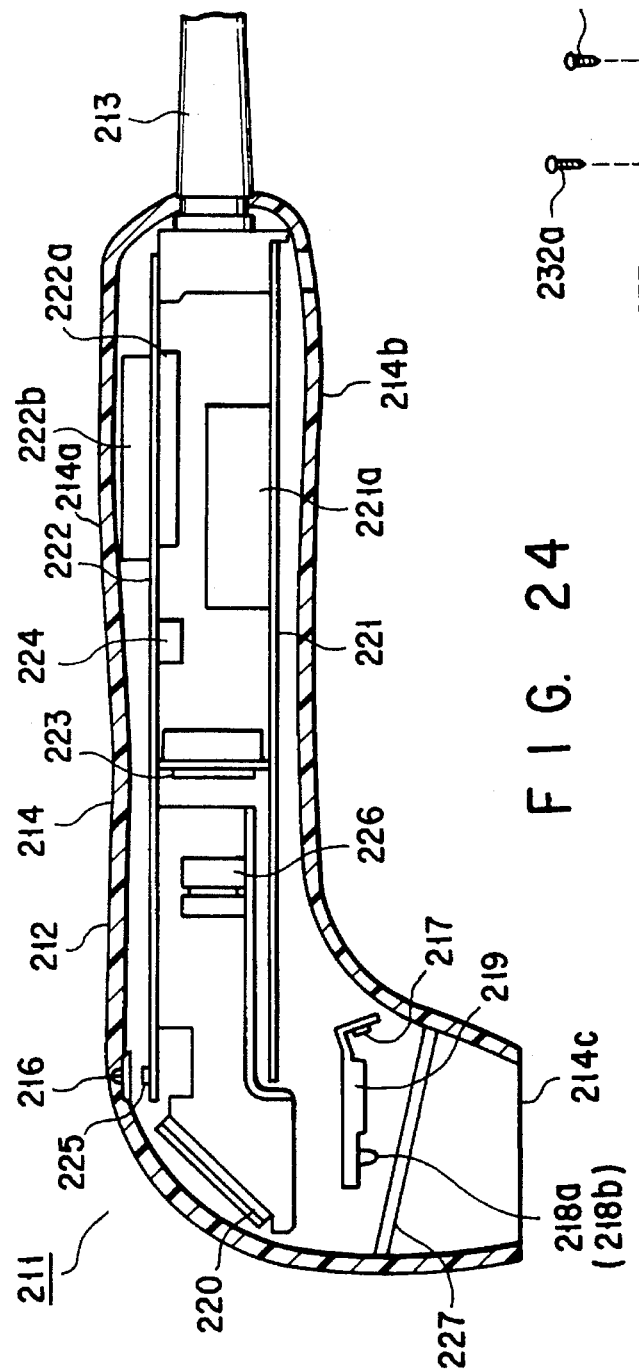
F I G. 24
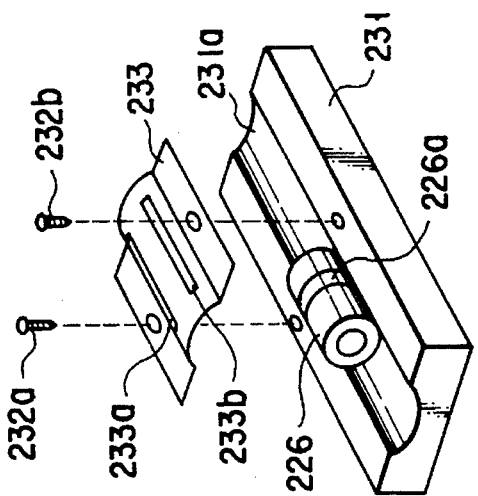
F I G. 26
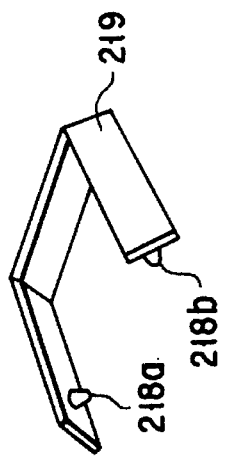
F I G. 25

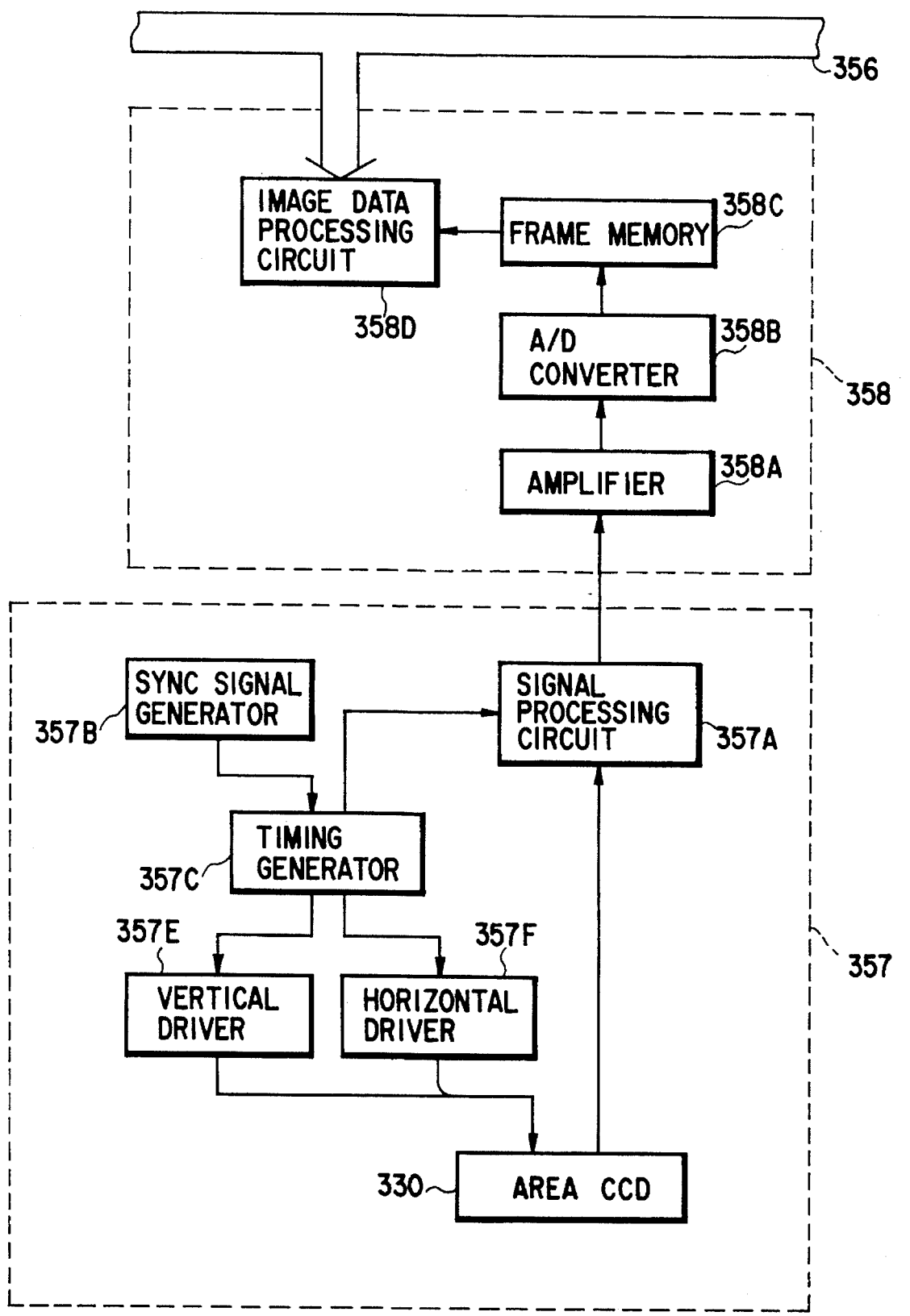
F I G. 30

OPTICAL CODE READER

BACKGROUND OF THE INVENTION

1. Field of the Invention

The present invention relates to an optical code reader for reading a 2-dimensional code affixed to an article and, more particularly, to an optical code reader which is held in a hand of an operator at the time of reading.

2. Description of the Related Art

In many supermarkets, article codes expressed in the form of bar codes are used for sales registration. FIG. 1A shows a bar code which is printed on the label of an article in advance and is read by a bar code scanner in sales registration. The bar code scanner detects an image of the bar code printed on the label of the article, and performs a read processing to obtain an article code from the detected image. This article code is supplied to an electronic cash register via a cable. The electronic cash register then performs a sales registration processing on the basis of the article code supplied from the bar code scanner.

FIG. 2A shows a touch type bar code scanner. In a bar code read operation, an operator holds the bar code scanner in his/her hand, and brings a read window 1A formed on the distal end of the bar code scanner into contact with the label of an article. In this state, the operator depresses a read switch 1B. This scanner has an LED light source and a line CCD inside the read window. These components operate together upon an operation of the read switch 1B. The LED light source illuminates the entire label. The line CCD then receives light reflected by a bar code printed on the label and detects a bar code image corresponding to the light. An LED indicator 1C is turned on when an article code is properly obtained from the bar code image detected by the line CCD, thus informing the operator of the completion of reading a code.

FIG. 2B shows a gun type bar code scanner. In a bar code read operation, an operator holds the bar code scanner in his/her hand, and directs a read window 2A formed on an upper portion of the bar code scanner to the label of an article. In this state, the operator depresses a read switch 2B. This scanner has a laser source and a photo detector inside the read window. These components operate together upon an operation of the read switch 2B. The laser source scans the label in one direction with a laser beam. The photo detector then receives light reflected by a bar code printed on the label and detects a bar code image corresponding to the light.

FIG. 2C shows a stationary type bar code scanner. In a bar code read operation, an operator holds an article in his/her hand, and directs the label of the article to a read window 3A of the bar code scanner fixed in advance. This scanner has a laser source and a photo detector inside the read window 3A. These components operate together all the time. The laser source scans the label in one direction with a laser beam. The line CCD then receives light reflected by a bar code printed on the label and detects a bar code image corresponding to the light.

The above-described bar code is used for article management not only in retail shops such as supermarkets but also in factories, distribution industry, service industry, and the like. With an increase in the number of application fields, article information other than an article code is also expressed in the form of a bar code, and the amount of information is increasing. However, the information capacity of a bar code is relatively small, and hence it is difficult to express a large amount of information in the form of a bar code. In order to overcome such a difficulty, 2-dimensional codes such as the multi-bar code shown in FIG. 1B and the matrix array code shown in FIG. 1C have been developed.

FIG. 3 shows a 2-dimensional code scanner for reading a 2-dimensional code. In this 2-dimensional code scanner, a TV camera 11 photographs a 2-dimensional code printed on a label 14 of an article under room illumination. An image processing unit 12 performs an image processing to obtain article information from an image of the 2-dimensional code photographed by the TV camera 11. A TV monitor 13 then displays the image Of the 2-dimensional code photographed by the TV camera 11.

This 2-dimensional code scanner is expensive, besides being relatively large and heavy. In addition, an operator must direct the label 14 of the article to the TV camera 11 without any inclination, and the focal point and aperture of the TV camera 11 must be adjusted before a read operation. Such a preparation for a read operation will delay start of a 2-dimensional code read operation.

A handy type 2-dimensional code scanner can provide a solution to the above described problem of time consuming preparatory procedures, although such a 2-dimensional code scanner is required to have an enhanced level of adaptability in terms of the size of codes it can read. For instance, it may need to be able to modify the ratio of magnification for reading codes and/or the size of the smallest readable code depending on the size of the cell used for the code to be read.

In a situation where the size of the smallest readable code varies, two 2-dimensional scanners, one that has a relatively small read window as shown in FIG. 4 and hence whose size of the smallest readable code is relatively small and one that has a relatively large read window and shown in FIG. 5 and hence whose size of the smallest readable code is relatively large, may be provided to accommodate the situation but such a 2-dimensional code scanner that can be used only for limited applications cannot easily be modified on the factory floor to adapt it to a different size of the smallest readable code.

SUMMARY OF THE INVENTION

It is object of the present invention to provide an optical code reader which can easily cope with a change in specifications concerning 2-dimensional codes to be read.

The above object is achieved by an optical code reader which is held in a hand of an operator and is brought near to an article having a 2-dimensional code affixed thereto at the time of reading. The optical code reader includes an illumination light source for illuminating the 2-dimensional code on the article, a reading unit for reading the 2-dimensional code from a light reflected by the article, and a frame member for housing the illumination light source and the reading unit in an internal space thereof, having a read window through which the reflected light passes, wherein the reading unit has an image sensor for sensing an image corresponding to the reflected light and converting the image to an electrical signal, a lens block for guiding the reflected light to the image sensor to form the image, an optical path length adjuster for adjusting the length of an optical path between the read window and the lens block upon change in the magnification of the lens block.

According to this optical code reader, the optical path length adjuster adjusts the length of an optical path between the read window and the lens block upon change in the magnification of the lens block. Therefore, the magnification of the lens block can be changed to reduce failures in reading the 2-dimensional code. This reduction improves the operability of the optical code reader. Further, a small number of components need to be modified when the magnification of the lens block is changed according to the specifications concerning 2-dimensional codes to be read. Therefore, the manufacturing cost can be reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1A to 1C are views respectively showing a bar code, a multi-bar code, and a matrix array code;

FIGS. 2A to 2C are perspective views respectively showing touch type, gun type, and stationary type bar code scanners;

FIG. 6 is a perspective view showing a 2-dimensional code scanner according to the first embodiment of the present invention;

FIG. 7 is a sectional view showing the 2-dimensional code scanner in FIG. 6;

FIG. 24 is a sectional view showing the 2-dimensional code scanner in FIG. 23;

FIG. 25 is a view showing the structure around an illumination light source in FIG. 24 in more detail;

FIG. 26 is a view showing the structure around a lens block in FIG. 24 in more detail;

FIG. 30 is a block diagram showing an image sensing circuit and image processing circuit in FIG. 29 in more detail.

DETAILED DESCRIPTION OF THE PREFERRED EMBODIMENTS

Figure 3:
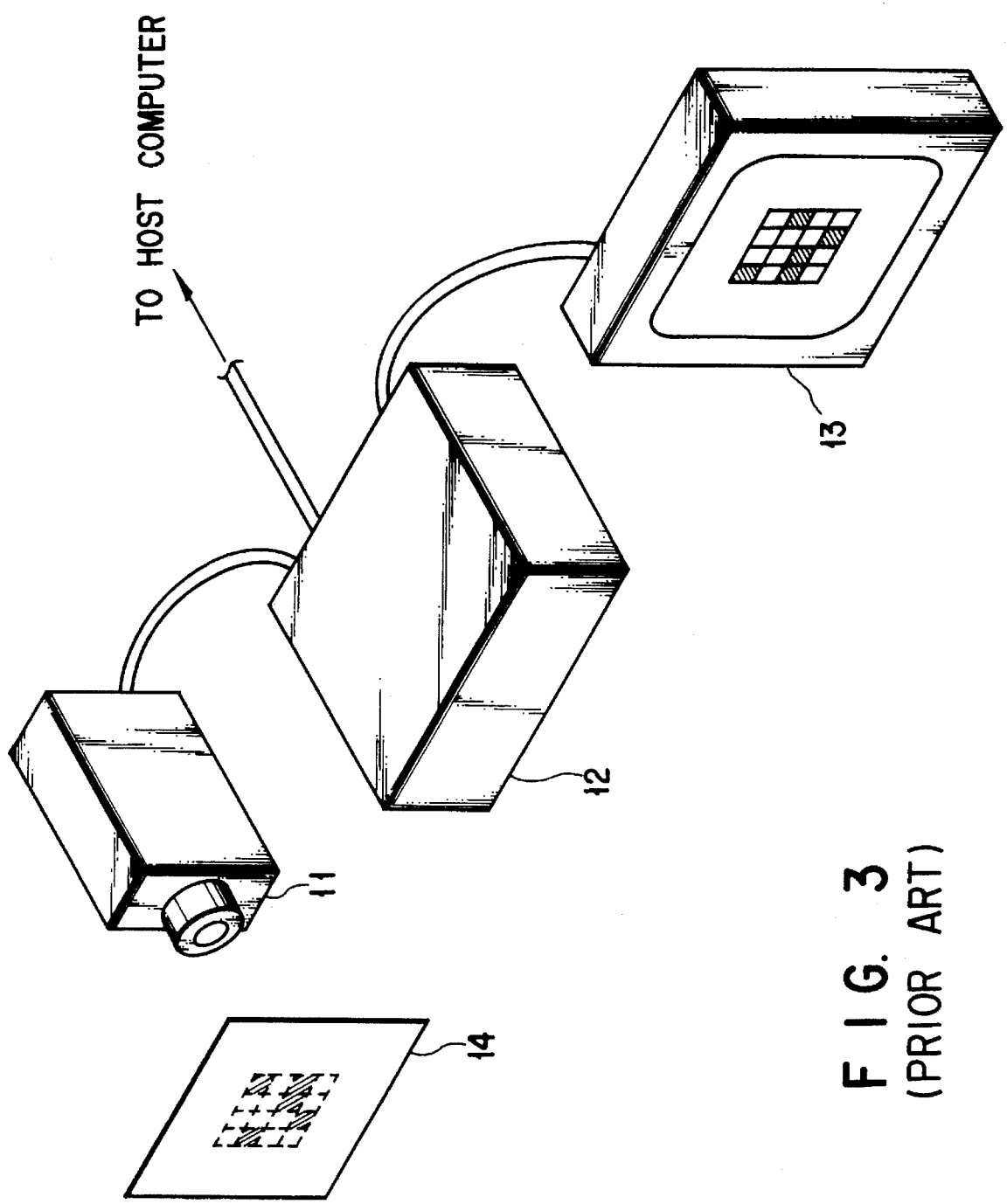
FIG. 3 is a view showing a conventional 2-dimensional code scanner.
Figure 4:
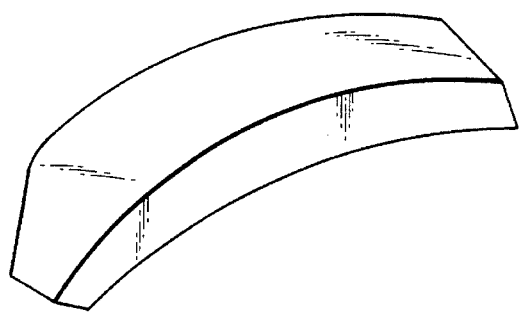
FIG. 4 is a view showing a conventional handy code scanner for relatively small 2-dimensional codes.
Figure 5:
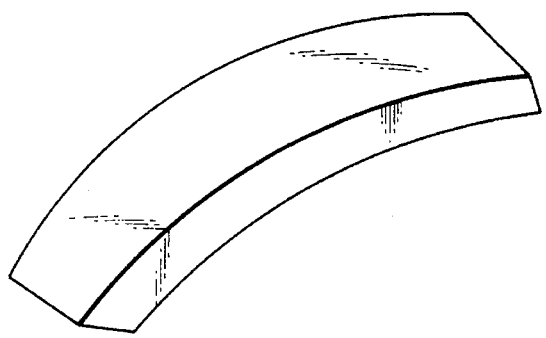
FIG. 5 is a view showing a conventional handy code scanner for relatively large 2-dimensional codes.

A 2-dimensional code scanner according to the first embodiment of the present invention will now be described with reference to the accompanying drawings. At the time of reading, this 2-dimensional code scanner is held in a hand of an operator and is brought near the label of an article on which a 2-dimensional code is printed.

FIG. 6 shows the outer appearance of this 2-dimensional code scanner. FIG. 6 shows the internal structure of the 2-dimensional code scanner. The 2-dimensional code scanner has a plastic frame 21. This frame 21 is molded into the shape shown in FIG. 6, and used to house various components, as shown in FIG. 7. The frame 21 has a 2-dimensional code read window 22 on its distal end, and also has an insertion port formed in its proximal end to allow insertion of a cable 24 for connecting the 2-dimensional code scanner to an external data processing unit, e.g., a host computer. The cable 24 contains power lines and data lines. The cable 24 is fixed in the insertion port with a protective member 25 such as a rubber bush. The proximal-end-side of the frame 21 is used as a grip portion. The read window 22 is a rectangular opening portion having a size slightly larger than that of a 2-dimensional code to be read. An axis perpendicular to a read window plane is set at an angle of at least 90 degrees or more with respect to the central axis of the grip portion. The scanner further includes a scanning end indicator LED 26 exposed on the upper surface of the frame 21, and a read switch 27 protruding from a side surface of the frame 21. The read switch 27 is depressed by the operator to permit start of reading a 2-dimensional code. The indicator LED 26 is turned on to inform the operator of the completion of a read operation.

The scanner further has a lens block access opening 28 formed on the upper surface of the frame 21, and the read window 22 is formed such that an optical path length adjusting cap 22a can be removably attached to the read window by press fitting or screwing.

In the internal space of the frame 21, an illumination light source 29, a deflecting mirror 30, a circuit board unit 31, an area CCD 32, a lens block 23, a filter 33, and a buzzer 36 are arranged. The illumination light source 29 is disposed near the read window 22 to illuminate the whole 2-dimensional code. This illumination light source 29 is constituted by a plurality of illumination LEDs arranged circularly or to form a regular polygon substantially close to a circle and plastic diffusion lenses for uniformly diffusing the illumination light from the illumination LEDs. The deflecting mirror 30 is disposed nearer to the proximal end than the illumination light source 29 and is set at a predetermined angle with respect to the read window plane such that incident light which comes from a 2-dimensional code via the read window 22 is reflected toward the area CCD 32. The filter 33 and the lens block 23 is arranged along the optical axis connecting the deflecting mirror 30 and the area CCD 32. The filter 33 is used to attenuate unnecessary external light, and the deflecting mirror 30 is used for guiding the reflected light from the deflecting mirror 30 to the light-receiving surface of the area CCD 32 so as to form an image.

The lens block 23 is removably introduced via the lens block access opening 28 and set at a position defined by guide bars 34. The guide bars 34 are engaged to the both sides of the lens block 23. In this state, the lens block access opening 28 is closed by a lens block anchor plate 35. The lens block 23 is constituted by an aperture mechanism 23a which controls the amount of light passing therethrough so as to obtain a proper brightness of an image formed on the light-receiving surface of the area CCD 32, and grouped lenses 23b which sufficiently suppress the distortion of the image.

The grouped lenses 23b have a magnification (or focal length) set such that an image of a desired size can be obtained on the area CCD 32, and antireflection coat is performed on the grouped lenses 23b to prevent a ghost image from being formed due to surface reflection. The buzzer 36 informs the operator of the occurrence of an error and the completion of a read operation by changing the tone and the number of times of sound production.

In the 2-dimensional code scanner, the lens block 23 can be removed from the lens block access opening 28 and replaced by another lens block having grouped lenses of a larger magnification. An optical path length from the read window 22 to the lens block 23 is preset so as to form on the area CCD 32 an image having proper contrast for digitalization. More specifically, the image must be formed in a condition that the magnification of the grouped lenses 23b is the minimum and a distance between a 2-dimensional code and the read window 22 is 10 mm or less. The optical path length adjusting cap 22a has a height determined according to the magnification of the grouped lenses 23b, and is attached to the read window 22 so as to absorb variation in the optimum value of the optical path length caused by replacement of the lens block 23.

The area CCD 32 is a solid-state image sensor for sensing an image formed through the lens block 23 and converting it into an electrical signal. The area CCD 32 has a large number of photo elements arranged in a matrix form on the light-receiving surface. The number of effective photo elements is set to be at least 250,000. (In place of the deflecting mirror 30, a prism may be used to change the traveling direction of light. In place of the grouped lenses 23b, an aspherical lens may be used to suppress the distortion of an image on the light-receiving surface of the area CCD 32. When a high-density 2-dimensional code is to be read, the number of effective photo elements of the area CCD 30 is preferably increased to 400,000 or more. In addition, the area CCD 32 may be replaced with another type of solid-state image sensor.)

The circuit board unit 31 is constituted by a plurality of circuit boards, each having various electronic parts mounted on one or both surfaces. These electronic parts constitute a read control circuit together with the area CCD 32. This read control circuit is electrically connected to the scanning end indicator LED 26, the read switch 27, the illumination light source 29, and the buzzer 36.

Figure 8:
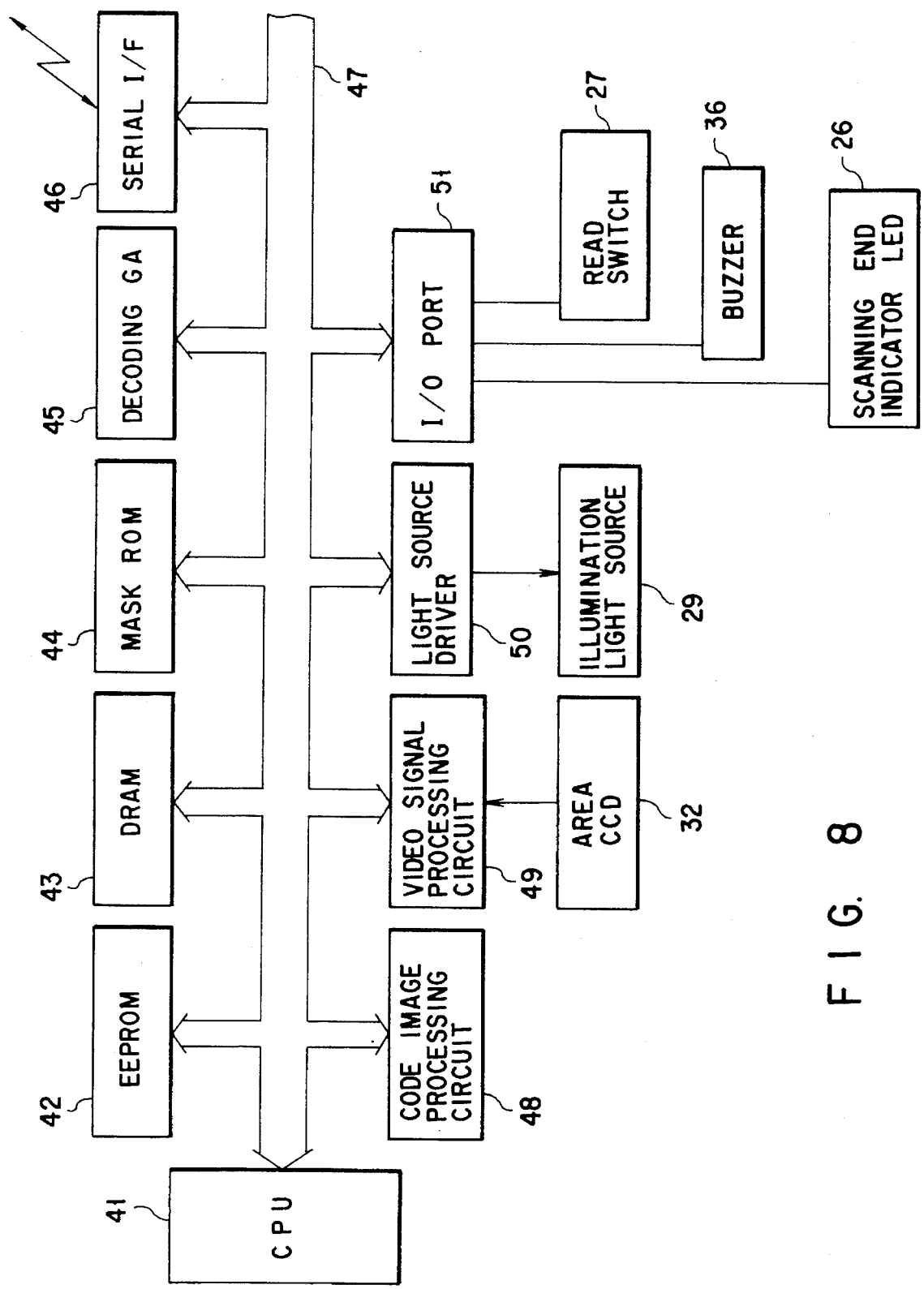
FIG. 8 is a block diagram schematically showing the arrangement of a read control circuit of the 2-dimensional code scanner in FIG. 6.

FIG. 8 schematically shows the arrangement of the read control circuit.

The read control circuit includes a CPU 41, an EEPROM 42, a DRAM 43, a mask ROM 44, a decoding circuit (gate array) 45, a serial interface 46, a bus line 47, a code image processing circuit 48, a video signal processing circuit 49, a light source driver 50, and an input/output port 51. The CPU 41 is connected to the EEPROM 42, the DRAM 43, the mask ROM 44, the decoding circuit 45, the serial interface 46, the code image processing circuit 48, the video signal processing circuit 49, the light source driver 50, and the input/output interface 51 via the bus line 47. The area CCD 32 is connected to the video signal processing circuit 49. The illumination light source 29 is connected to the light source driver 50. The scanning end indicator LED 26, the read switch 27, and the buzzer 36 is connected to the input/output port 51. The interface 46 is connected to the host computer. The CPU 41 performs a read control process of controlling the above-described various components to read a 2-dimensional code. The EEPROM 42 stores a control program for the read control process and initial setup data. The DRAM 43 temporarily stores various data. A plurality of memory areas are set in the DRAM 43 to store various data in the above read control process. The mask ROM 44 stores read formats concerning 2-dimensional symbols (2-dimensional codes) of predetermined types. The decoding circuit 45 converts black/white array data of a 2-dimensional code into character or numeral data serving as article information based on the format obtained from the mask ROM 44. The interface 46 serves to communicate with the host computer via the cable 24. The video signal processing circuit 49 detects an image formed on the area CCD 32, and outputs the image as an analog video signal. The code image processing circuit 48 performs an image processing of converting the analog video signal output from the video signal processing circuit 49 into dot image data, distinguishing a 2-dimensional code part from the background thereof in the image data, and producing black/white array data representing black and white sections arrayed in the 2-dimensional code part. The light source driver 50 drives the illumination light source 29 under the control of the CPU 1. The input/output port 51 drives the scanning end indicator LED 26, the read switch 27, and the buzzer 36.

Figure 9:
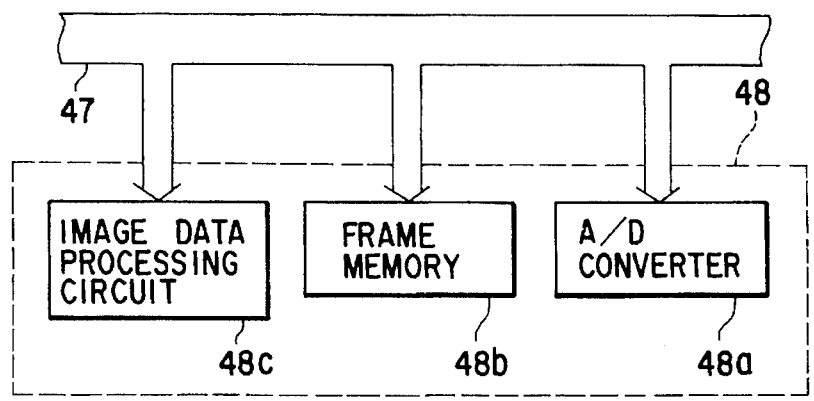
FIG. 9 is a block diagram showing a code image processing in FIG. 8 in more detail.
Figure 10:
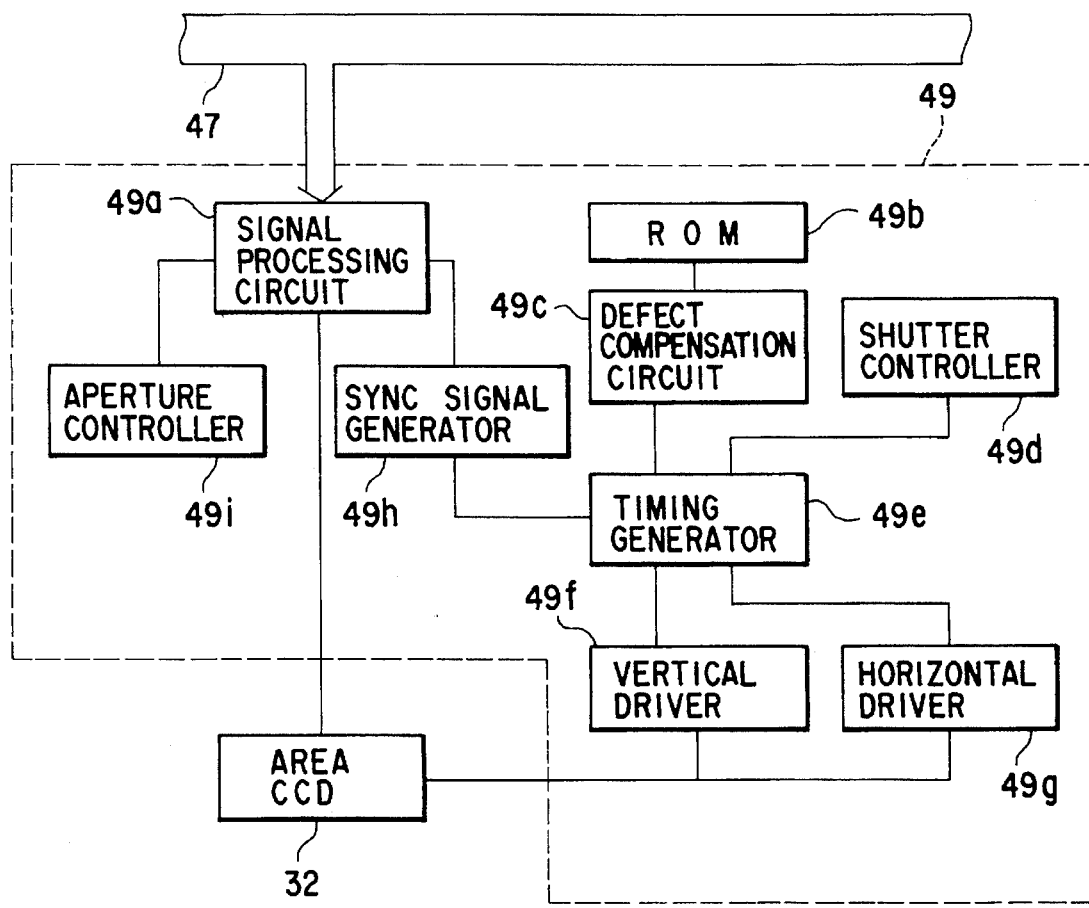
FIG. 10 is a block diagram showing a video signal processing circuit in FIG. 8 in more detail.

FIG. 9 shows the code image processing circuit 48 in more detail, and FIG. 10 shows the video signal processing circuit 49 in more detail.

As shown in FIG. 9, the code image processing circuit 48 comprises an A/D (analogue/digital) converter 48a performs analog-to-digital conversion on the analog video signal from the video signal processing circuit 49, a frame memory 48b for storing a dot image data obtained by converting each digital data to dot data with reference to a preset threshold value and setting the dot data to a corresponding one of the locations assigned to the photo elements of the area CCD 32, and an image data processing circuit 48c for performing processes of density correction, emphasis, smoothing, and the like on the image data stored in the frame memory 48b, for distinguishing a 2-dimensional code part from the background in the image data, and for performing processes of a rotation, feature extraction, and the like on image data of the 2-dimensional code part to produce black/white array data representing black and white sections arrayed in the 2-dimensional code part. The A/D converter 48a, the frame memory 48b and the image processing circuit 48c are connected to the system bus 47.

As shown in FIG. 10, the video signal processing circuit 49 comprises a signal processing circuit 49a connected to the system bus 47 for amplifying the output signal supplied from the 2-dimensional CCD 32, a ROM 49b storing data on the variances (defects) in the characteristics of the photo elements given rise to at the time of manufacturing the area CCD 32, a defect compensation circuit 49c for compensating the operation timing of of each photo element on the basis of the data stored in the ROM 49b, a shutter controller 49d for setting a sensing period for sensing an image of a 2-dimensional code on an article, a timing generator 49e for generating a operation timing signal on the basis of the signals from the defect compensation circuit 49c and the shutter controller 49d, vertical and horizontal drivers 49f and 49g for specifying photo elements of the area CCD 32 in synchronism with the operation timing signal obtained by the timing generator 49e, a sync signal generator 49h for generating a sync signal indicating a timing of sampling a voltage level for each photo element from the video signal output from the signal processing circuit 49a, and an aperture controller 49i for automatically controlling the aperture mechanism 23a to maximize the amplitude of the video signal from the signal processing circuit 49a.

The operation of the 2-dimensional code scanner will be described below.

Figure 11:
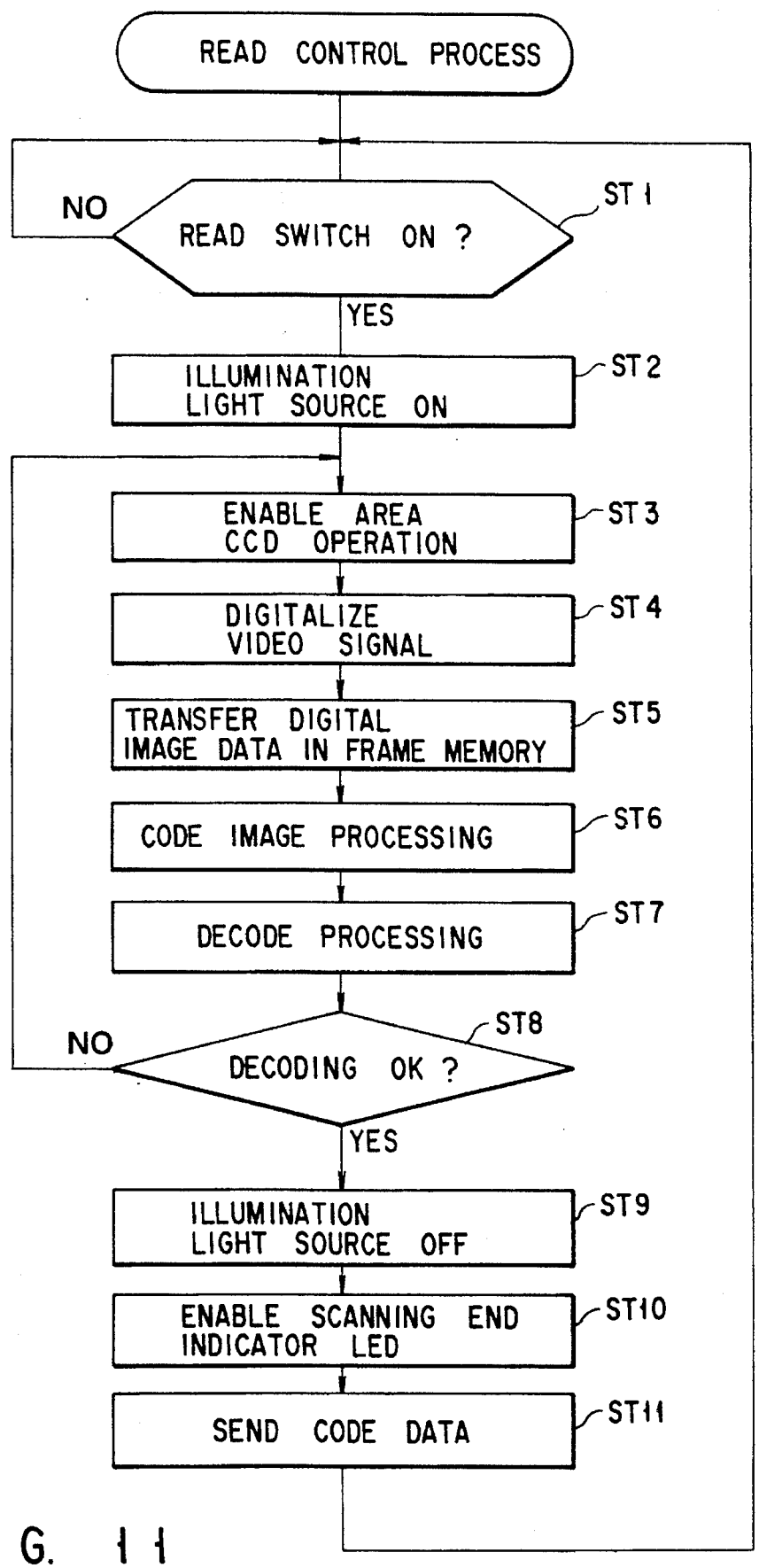
FIG. 11 is a flowchart showing a read control process performed in the operation of the 2-dimensional code scanner.

The read control circuit performs a read control process shown in FIG. 11 after the circuit components are initialized upon supply of power. When the read control process begins, the 2-dimensional code scanner is set in a stand-by state for awaiting an operation of the read switch 27. If the operation of the read switch 27 is detected in step ST1, power supply to the illumination light source 29 is enabled in step ST2 to turn on the LEDs therein. Thereafter, the area CCD 32 starts to operate in step ST3, the video signal supplied via the video signal processing circuit 49 is digitalized in step ST4, and transferred to the frame memory 48b as image data in step ST5. The image data is mapped in the frame memory 48b according to the matrix of photo elements in the area CCD 32. In step ST6, an image processing is performed to distinguish a 2-dimensional code part from the background in the image data to produce the black/white array data described above. The black/white array data is stored in the DRAM 43, and transferred to the decoding circuit 45. In step ST7, the decoding circuit 45 converts the black/white array data to characters and numeral data serving as article information, with reference to the format stored in the mask ROM 44. In step ST8, it is checked whether the decoding process has been completed normally in the decoding circuit 45. If an error occurs in the decoding process, step ST3 is executed again.

If the decoding process is completed normally, the power supply to the illumination light source 29 is disabled to turn off the LEDs therein, and the scanning end indicator LED 26 and the buzzer 36 are driven to indicate the completion of a reading operation. In step ST11, article information obtained in the decoding process is send to the data processing device, i.e., the host computer. The step ST1 is executed again after the article information has been send.

In the embodiment described above, before start of reading a 2-dimensional code, the operator sets a lens block 23 of a desired magnification inside the 2-dimensional code scanner via the lens access opening 28, and fitting an optical path length adjusting cap 22a prepared for the lens block 23 to the read window 22. Thereafter, the operator holds the 2-dimensional code scanner in his/her hand, directs the front opening of the cap 22a to the label of an article, and depresses the read switch 27. Upon operation of the read switch 27, the illumination light source 29 is driven to illuminate the 2-dimensional code, a light reflected from the 2-dimensional code is guided to the light-receiving surface of the area CCD 32 by the deflecting mirror 30, the filter 33, the grouped lenses 23b, and the aperture mechanism 23 to form an image thereon. This image is converted to a video signal by the area CCD 32. Thereafter, the video signal is electrically processed to read the 2-dimensional code.

Figure 12A:
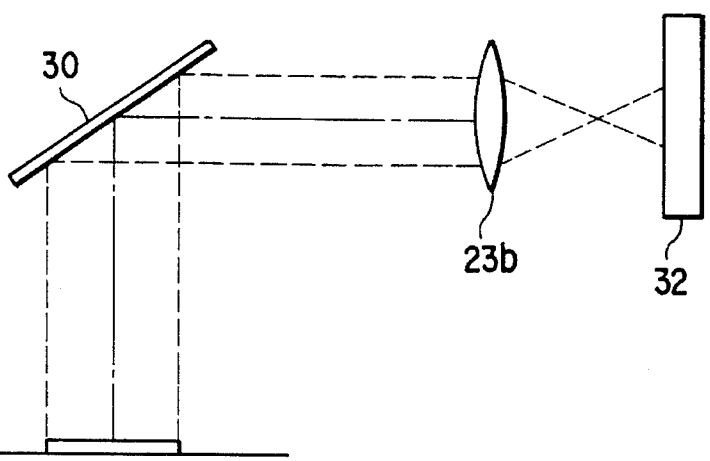
FIG. 12A is a view showing an optical path for a light which is focused to a CCD to form an image by a set of grouped lenses having a first magnification.
Figure 13A:
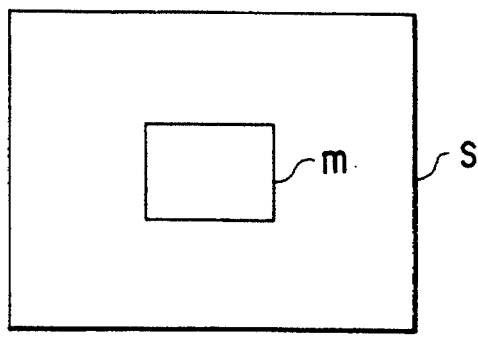
FIG. 13A is a view showing a range of the image formed on the CCD by the set of grouped lenses having the first magnification.

If the magnification of the grouped lenses 23b is relatively low, the reflected light from the 2-dimensional code is guided to the light-receiving surface of the area CCD 32 through an optical path shown in FIG. 12A. At this time, as shown in FIG. 13A, an image is formed in an area m narrower than the entire area S of the light-receiving surface. Therefore, the scanner easily fails to read a 2-dimensional code.

Figure 12B:
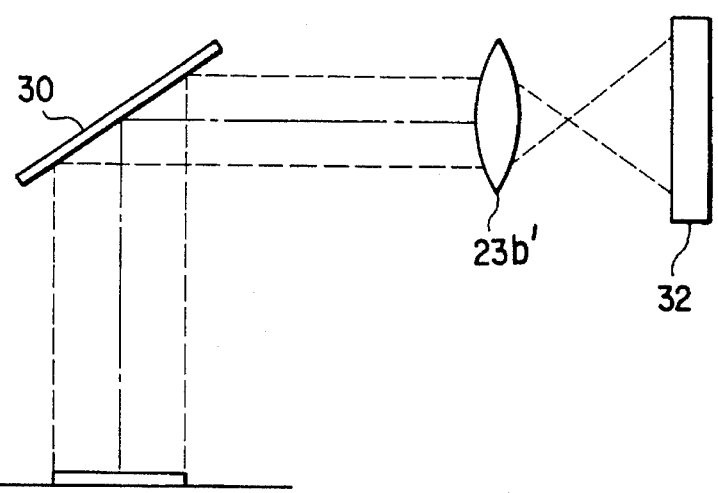
FIG. 12B is a view showing an optical path for a light which is focused to a CCD to form an image by a set of grouped lenses having a second magnification.
Figure 13B:
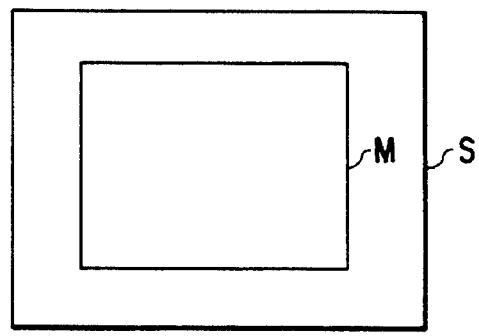
FIG. 13B is a view showing a range of the image formed on the CCD by the set of grouped lenses having the second magnification.

This problem can be remedied by replacing the lens block 23 with another one having grouped lenses 23b of a larger magnification, and also replacing the optical path length adjusting cap 22a with another one having a height suitable for the higher magnification. In this case, the reflected light from the 2-dimensional code is guided to the light-receiving surface of the area CCD 32 through an optical path shown in FIG. 12B. At this time, as shown in FIG. 13B, an image is formed in an area M broader than the area m.

According to the above-described embodiment, the 2-dimensional code scanner can be made small and lightweight and manufactured at low cost, since all of the illumination light source 29, the deflecting mirror 30, the lens block 23, the area CCD 32, and the circuit board unit 31 are received within the internal space of the frame 21. Further, it is free from any cumbersome operations for adjusting the focal point and the aperture, since a 2-dimensional code is read in a state that the distal end of the scanner is brought close to the label of an article on which the code is printed. Therefore, the 2-dimensional code can be read quickly without any difficulty.

Furthermore, the lens block 23 and the optical path length adjusting cap 22b may be replaced in order to change the size of an image formed on the light-receiving surface of the area CCD 32 and/or the density of the image. This makes it possible to reduce failures in reading a 2-dimensional code, and improve the operability of the scanner. In addition, it is not necessary to modify a large number of components so as to cope with a change in the specifications concerning 2-dimensional codes to be read.

In this embodiment, when the lens block 23 has a minimum magnification, no optical path length adjusting cap 22a is attached to the read window 22, since the optical path length between the read window 22 and the lens block 23 is suitable for the minimum magnification. However, the optimum value of the optical path length varies upon replacement of the lens block 23. Therefore, a set of optical path length adjusting caps 22a for replaceable lens blocks 23 are prepared to absorb the variation. These caps 22a have different heights determined according to the magnifications of the replaceable lens blocks 23, and are used together with the corresponding replaceable lens blocks 23. In addition, it is possible to use another type of optical path length adjusting cap whose height is variable for each replaceable lens block 23.

Figure 14:
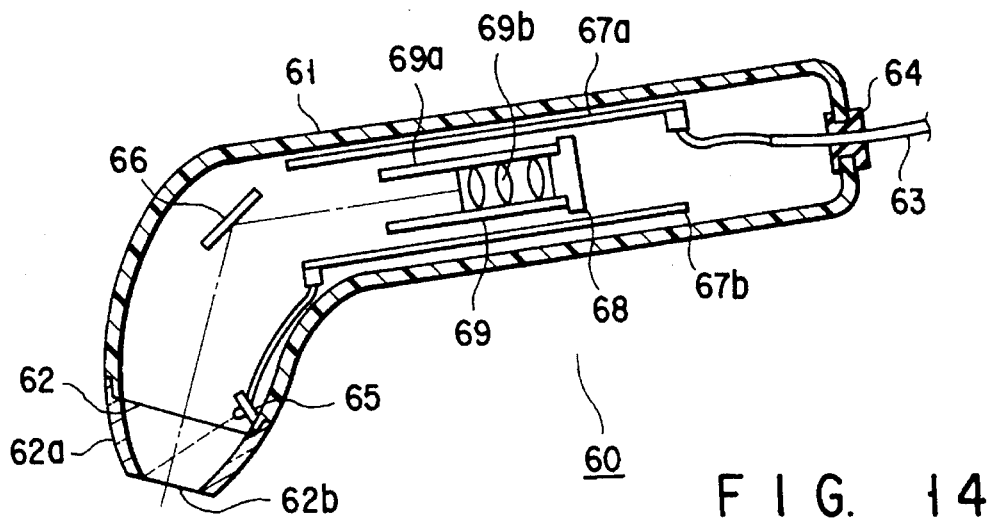
FIG. 14 is a sectional view showing a 2-dimensional code scanner according to the second embodiment of the present invention.
Figure 15:
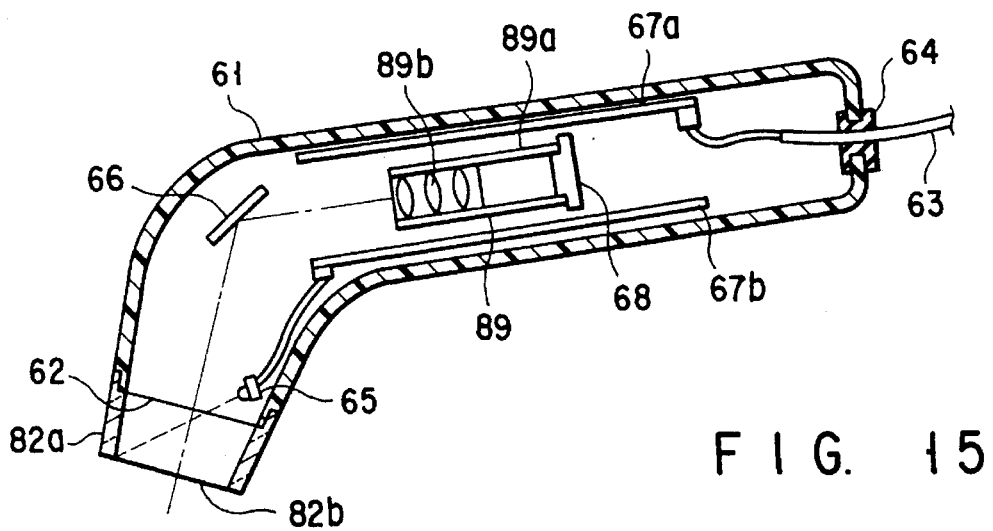
FIG. 15 is a sectional view showing the 2-dimensional code scanner in which a cap in FIG. 14 is replaced to change the minimum cell width of a 2-dimensional code.

A 2-dimensional code scanner according to a second embodiment of the present invention will be described with accompanying drawings. FIG. 14 shows a 2-dimensional code scanner 60 for 2-dimensional codes with a minimum cell width of 0.127 mm. FIG. 15 shows a 2-dimensional handy scanner 80 for 2-dimensional codes with a minimum cell width of 0.254 mm.

Likewise the first embodiment, the 2-dimensional code scanner 60 comprises a read control circuit shown in FIG. 8 to FIG. 10, and performs a read control process shown in FIG. 11. Therefore, a description on the read control process is omitted in this embodiment.

The 2-dimensional code scanner 60 has a plastic frame 61. This frame 61 is molded into the shape shown in FIGS. 14 and 15, and used to house an illumination light source 65, a deflection mirror 66, circuit boards 67a and 67b, an area CCD 68, a lens block 69, and other components. The frame 61 has an opening 62 on its distal end, and also has an insertion port formed in its proximal end to allow insertion of a cable 63 for connecting the 2-dimensional code scanner to an external data processing unit, e.g., a host computer. The cable 63 contains power lines and data lines. The cable 63 is fixed in the insertion port with a protective member 64. The proximal-end-side of the frame 61 is used as a grip portion. The scanner further has a cap 62a removably attached to the opening 62. The cap 62a has a read window 62b for 2-dimensional codes of a type shown in FIG. 1C. The read window 62b is an opening having a size for the 2-dimensional code which is printed to have a height of 14.7 mm and a minimum cell width of 0.127 mm by a printer of 400 DPI. An axis perpendicular to a read window plane is set at an angle of at least 90 degrees or more with respect to the central axis of the grip portion.

The illumination light source 65 is located on one side of the opening 62, and mounted on the frame 61 at a variable angle. The angle of the illumination light source 65 is adjusted for illuminating the whole 2-dimensional code through the read window 62b. This illumination light source 65 is constituted by a line of illumination LEDs for emitting illumination light and plastic diffusion lenses for uniformly diffusing the illumination light from the illumination LEDs. The deflecting mirror 66 is disposed nearer to the proximal end than the illumination light source 65 and is set at a predetermined angle with respect to the read window plane such that incident light which comes from the 2-dimensional code via the read window 62b is reflected toward the area CCD 68. The lens block 69 is arranged along the optical axis connecting the deflecting mirror 66 and the area CCD 68, and focuses the reflected light from the deflecting mirror 66 to the light-receiving surface of the area CCD 68 to form an image. The light-receiving surface of the area CCD 68 includes 440,000 photo elements (pixels) arranged in a matrix of 582 rows×752 columns, and senses the image by five photo elements per one cell of the 2-dimensional code. Each of the circuit boards 67a and 67b has various electronic parts mounted on one or both surfaces. These electronic parts constitute the read control circuit together with the area CCD 68. This read control circuit is electrically connected to the illumination light source 65 and also to the scanning end indicator LED, the read switch, and the buzzer (not shown).

The lens block 69 has a set of grouped lenses 69b for the minimum cell width of 0.127 mm and a lens holder 69a for holding the grouped lenses 69b. The lens block 69 is removably mounted on the circuit boards 67a and 67b such that the light-receiving surface of the area CCD 68 is located next to an end of the lens block 69. In the lens holder 69a, the set of the grouped lenses 69b is disposed at a position which is determined on an area CCD side for the minimum cell width of 0.127 mm. Accordingly, when the 2-dimensional code is set at a distance of 10 mm or less from the read window 62b, an image having a proper contrast for digitalization can be formed on the light-receiving surface of the area CCD 68.

To read 2-dimensional codes with a minimum cell width, for example, of 0.254 mm, the scanner can be modified as shown in FIG. 15 by replacing the cap 62a and the lens block 69 with a cap 82a and a lens block 89, and adjusting the angle of the illumination light source 65. The cap 82a has a read window 82b to read 2-dimensional codes of a type shown in FIG. 1C. The read window 82b is an opening having a size for the 2-dimensional code which is printed to have a height of 29.4 mm and a minimum cell width of 0.254 mm by a printer of 400 DPI. An axis perpendicular to a read window plane is set at an angle of at least 90 degrees or more with respect to the central axis of the grip portion. The angle of the illumination light source 65 is adjusted for illuminating the whole 2-dimensional code facing the read window 82b. The lens block 89 has a set of grouped lenses 89b for the minimum cell width of 0.254 mm and a lens holder 89a for holding the grouped lenses 89b. The lens block 89 is removably mounted on the circuit boards 67a and 67b such that the light-receiving surface of the area CCD 68 is located next to an end of the lens block 89. In the lens holder 89a, the set of grouped lenses 89b is disposed at a position which is determined on the deflecting mirror side for the minimum cell width of 0.254 mm. Accordingly, when the 2-dimensional code is set at a distance of 10 mm or less from the read window 82b, an image having a proper contrast for digitalization can be formed on the light-receiving surface of the area CCD 68.

In the second embodiment, each of the caps 62a and 82a is removably attached to the opening 62, each of the lens blocks 69 and 89 is removably mounted on the caps 67a and 67b, and the illumination light source 65 is mounted on the frame 61 at a variable angle. Therefore, it is possible to easily change the size of the smallest readable code by replacing the cap 62a and the lens block 69 with the cap 82a and lens block 89 and adjusting the angle of the illumination light source 65. Moreover, it is not necessary to modify a large number of components so as to cope with a change in the specifications concerning 2-dimensional codes to be read.

A 2-dimensional code scanner according to a third embodiment of the present invention will be described with accompanying drawings.

Figure 16:
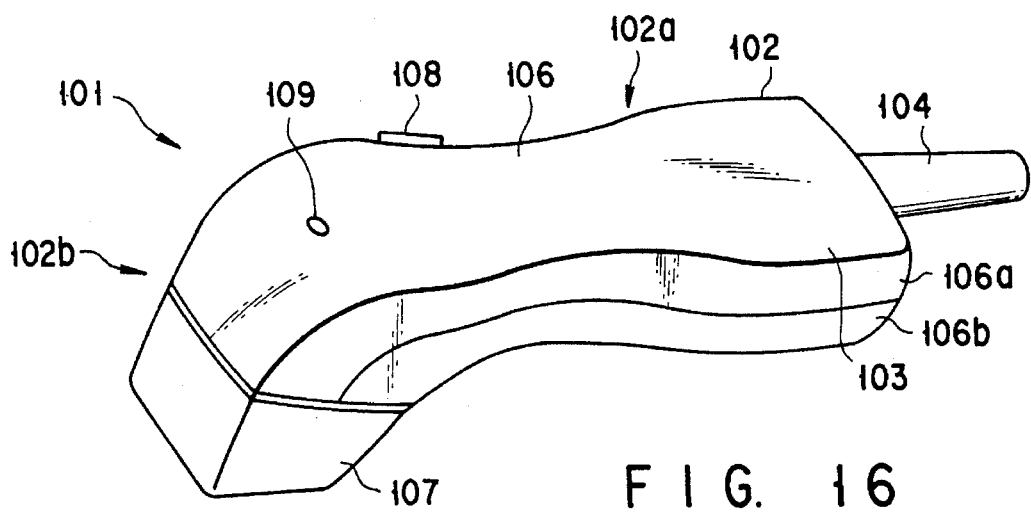
FIG. 16 is a perspective view showing a 2-dimensional code scanner according to the third embodiment of the present invention.
Figure 17:
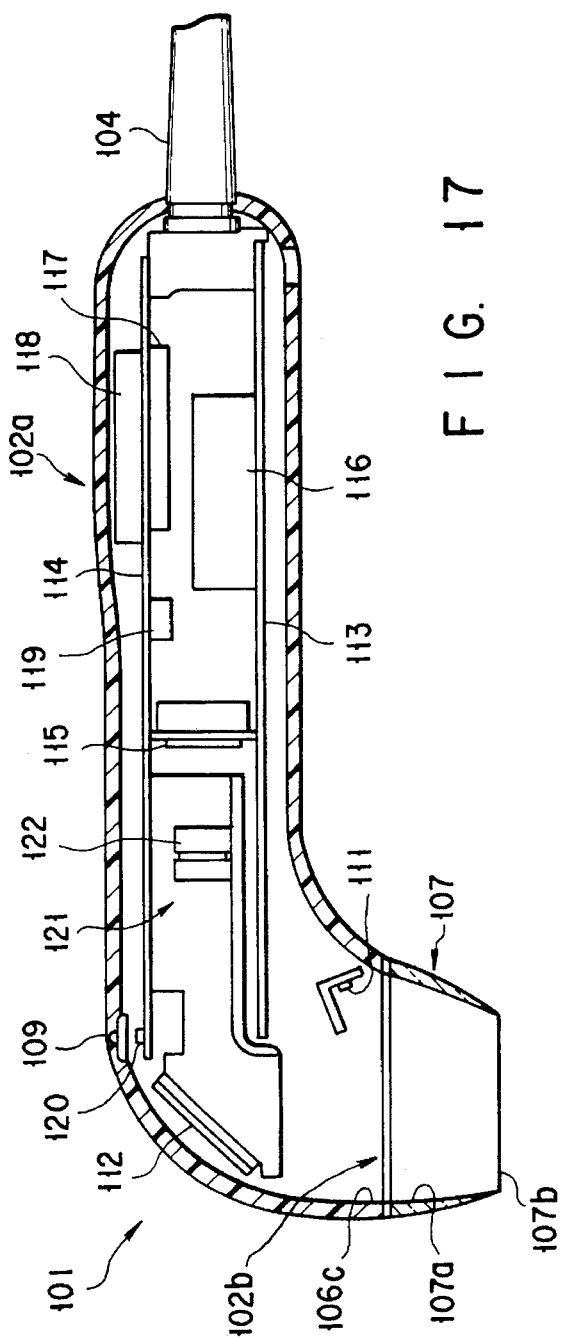
FIG. 17 is a sectional view showing the 2-dimensional code scanner in FIG. 16.

FIG. 16 shows the outer appearance of this 2-dimensional code scanner. FIG. 17 shows the internal structure of the 2-dimensional code scanner. Likewise the first embodiment, the 2-dimensional code scanner 101 comprises a read control circuit shown in FIG. 8 to FIG. 10, and performs a read control process shown in FIG. 11. Therefore, a description on the read control process is omitted in this embodiment.

The 2-dimensional code scanner has a plastic frame 103. This frame 103 is composed of a main frame 106 and an end frame (cap) 107 which are molded into the shape shown in FIG. 16. The cap 107 is removably attached to the distal end of the main frame 106 by press fitting or screwing. The main frame 106 is composed of an upper frame 106a and a lower frame 106b which are removably fitted to each other by press fitting and screwing. The frame 103 has an insertion port formed in its proximal end to allow insertion of a cable 104 for connecting the 2-dimensional code scanner to an external data processing unit, e.g., a host computer. The cable 104 contains power lines and data lines, and fixed in the insertion port with a protective member such as a rubber bush. The proximal-end-side of the frame 103 is used as a grip portion 102a. The frame 103 is used for housing an illumination light source 111, a deflecting mirror 112, circuit boards 113 and 114, an area CCD 115, a buzzer 119, a scanning end indicator LED (light emitting diode) 120, an optical unit 121, and other components. The scanning end indicator LED 26 and the buzzer 119 are used to inform the operator of the completion of a read operation. The scanning end indicator LED 26 is exposed from an opening 109 formed on the upper frame 106a.

The cap 107 has an opening 107a and a 2-dimensional code read window 107b. The opening 107a is set to be in contact with an opening 106c formed on the distal end of the main frame 106. An axis perpendicular to a read window plane is set at an angle of at least 90 degrees or more with respect to the central axis of the grip portion 102a. The thickness of the cap 107 gradually decreases from the opening 107a toward the read window 107b.

The illumination light source 111 is located near the opening 106c and mounted on the frame 106 at a variable angle so as to illuminate an entire 2-dimensional code. This illumination light source 111 is constituted by a plurality of illumination LEDs horizontally arranged in one line for emitting illumination light and plastic diffusion lenses for uniformly diffusing the illumination light from the illumination LEDs. The angle of the illumination light source 111 is adjusted for illuminating the whole 2-dimensional code through the read window 107b. The deflecting mirror 112 is disposed nearer to the proximal end than the illumination light source 111 and is set at a predetermined angle with respect to the read window plane such that incident light which comes from the 2-dimensional code via the read window 107b is reflected toward the area CCD 115.

The optical unit 121 is composed of a filter (not shown) and a lens block 122. The filter is used to attenuate unnecessary external light. The lens block 122 is arranged along the optical axis connecting the deflecting mirror 112 and the area CCD 115, and focuses the reflected light from the deflecting mirror 112 to the light-receiving surface of the area CCD 115 to form an image. The lens block 122 is constituted by an aperture mechanism and grouped lenses 23b (not shown). The area CCD 115 is a solid-state image sensor for sensing the image formed through the lens block 122 and converting it into an electrical signal. The area CCD 115 has a large number of photo elements arranged in a matrix form on the light-receiving surface. The number of effective photo elements is set to be at least 250,000. (When a high-density 2-dimensional code is to be read, the number of effective photo elements of the area CCD 115 is preferably increased to 400,000 or more. Further, antireflection coat is performed on the grouped lenses to prevent a ghost image from being formed due to surface reflection. In place of the grouped lenses, an aspherical lens may be used to suppress the distortion of an image on the light-receiving surface of the area CCD 115.)

The position of the lens block 122 is determined such that when the 2-dimensional code is set at a distance of 10 mm or less from the read window 107b, an image having a proper contrast for digitalization can be formed on the light-receiving surface of the area CCD 115. The circuit boards 113 and 114 is a video signal processing board and a code image processing board each of which has various electronic parts mounted on one or both surfaces. These electronic parts constitute the read control circuit together with the area CCD 115. This read control circuit is electrically connected to the illumination light source 111, the scanning end indicator LED 120, the read switch 108, and the buzzer 119. In FIG. 17, 116, 117, and 118 denote a DC-DC converter, a CPU, and a ROM, respectively.

The 2-dimensional code scanner described above reads a 2-dimensional code as in the same manner as the first embodiment.

Figure 19:
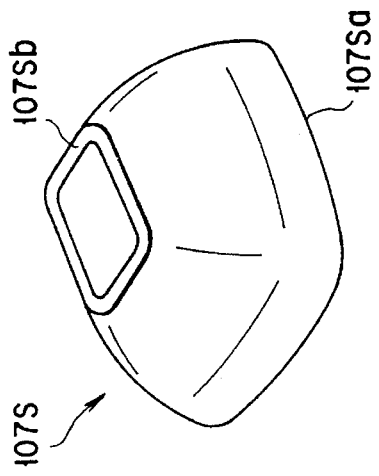
FIGS. 18 and 19 are views showing examples of an end cap which is connectable to the 2-dimensional code scanner in FIG. 16.
Figure 18:
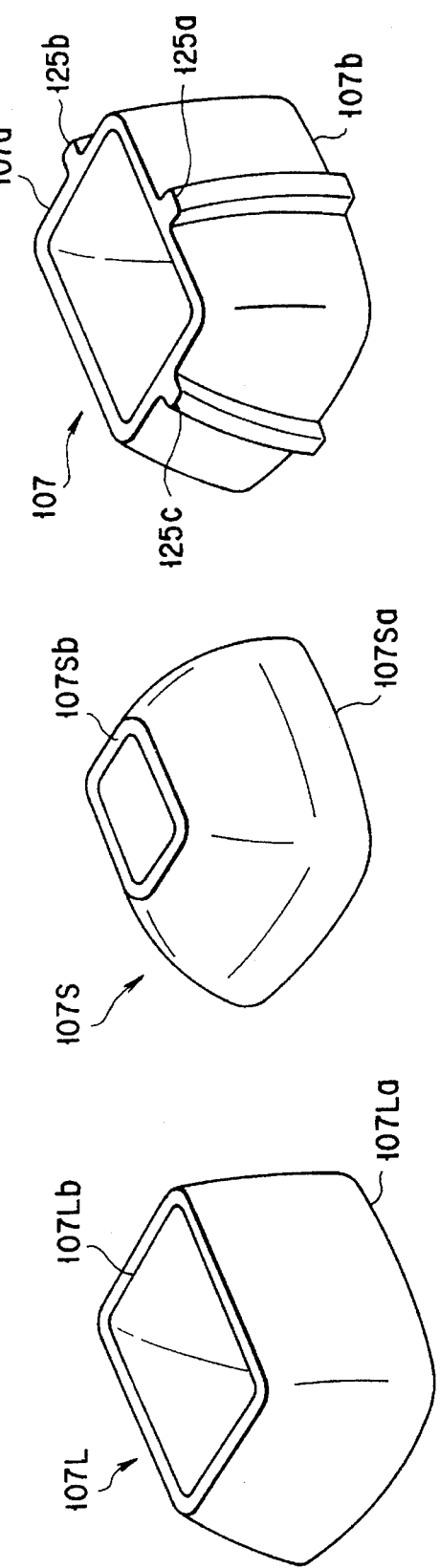

Generally, it is preferable that the reading area of the 2-dimensional code scanner is determined for each 2-dimensional code to be read. Therefore, the magnification of the lens block 122 is decreased when the 2-dimensional code to be read has a relatively large size, and increased when the 2-dimensional code to be read has a relatively small size. The cap 107 shown in FIG. 17 is replaced according to the magnification of the lens block 122. FIG. 18 shows a cap 107L used for a 2-dimensional code having a relatively large size, and FIG. 19 shows a cap 107S used for a 2-dimensional code having a relatively small size. Each of openings 107La and 107S is set to have the same size as that of the opening 106c in the main frame 106, and each of openings 107Lb and 107Sb is set to have substantially the same size as the size of a corresponding 2-dimensional code. Therefore, the reading area which the scanner can read a 2-dimensional code is defined by each of the read windows 107Lb and 107Sb. At the time of reading a 2-dimensional code, the operator brings the read window 107b into contact with the 2-dimensional code printed on the label of an article, and depresses the read switch 108.

In this embodiment, the reading area is set to be almost equal to the size of the read window 107b. Hence, the 2-dimensional code can be more easily guided to the reading area than in the case where the reading area is smaller than the read window 107b.

Further, the cap 10 is so structured that it has a thickness of virtually zero at the periphery of the read window 107b. Therefore, the cap 10 will conceal no part of the 2-dimensional code, thus preventing reading errors.

As in the first and second embodiment, the frame 103 contains various components. This embodiment can therefore be made small and light and at a low cost, and can yet read a 2-dimensional code easily and accurately within a short time.

In this embodiment, one of two types of caps, i.e., the cap 107L and the cap 107R, is attached to the main frame 106 in accordance with the reading area selected for the 2-dimensional code scanner. Instead, three or more types of caps may be used, and one of these caps may be attached to the main frame 106.

Figure 20:
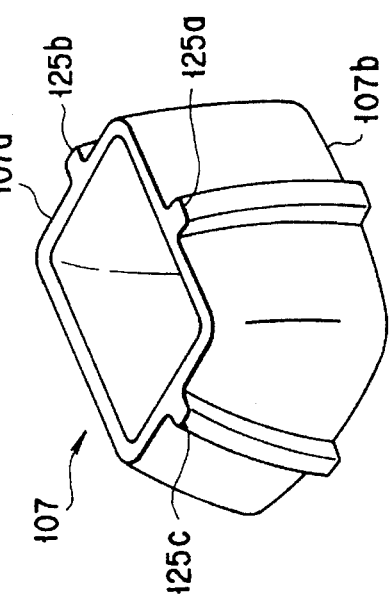
FIG. 20 is a view showing a modification of the end cap in FIG. 16.

The cap 107 shown in FIG. 16 may be replaced by one shown in FIG. 20. The cap 107 shown in FIG. 20 is characterized in that it has ribs 125a, 125b and 125c on its outer sides.

The rib 125a is located at the front of the cap 107, whereas the ribs 125b an 125c are provided on the left and right sides of the cap 107, respectively. Each of these ribs 125a, 125b and 125c is located at the center portion of a corresponding side and extends straight, such that it connects the opening 107a and the read window 107b. The rib 125a indicates the midpoint of the reading area, as viewed in the span direction of the 2-dimensional code. The ribs 125b and 125c indicates the midpoints of the reading area, as viewed in the height direction of the 2-dimensional code. The thickness of the cap 107 gradually decreases from the opening 107a toward the read window 107b, and is virtually zero at the periphery of the read window 107b, as in the third embodiment.

With this modified embodiment, an operator can move the read window 107b to the 2-dimensional code, using the ribs 125a, 125b and 125c as reference marks. Even if the read window 107b is displaced with respect to the 2-dimensional code, inevitably contacting the label, this positional displacement can be eliminated with ease. This enables the operator to set the 2-dimensional code within the reading area accurately, without difficulty. Speedy reading of 2-dimensional codes can therefore be accomplished.

In the modified embodiment, the ribs 125b and 125c are provided to indicate the midpoints of the reading area, as viewed in the height direction of the 2-dimensional code. Nonetheless, it suffices to provide only one of these ribs 125b and 125c. Alternatively, another rib may be provided on the rear of the cap 107 to indicate the midpoint as viewed in the span direction of the 2-dimensional code, as does the rib 125a. If three or more ribs are provided on the outer sides of the cap 107, the read window 107b will be held steadfast.

The ribs are provided on the cap 107 which is removably attached to the main frame 106. Instead, the ribs may be formed on the main frame in the case where the read window is an opening made in the tip of the main frame.

A 2-dimensional code scanner according to a fourth embodiment of the present invention will be described below, with reference to the accompanying drawings.

First, two ordinary schemes of determining the position of a lens block which focuses the light reflected from a 2-dimensional code to form an image on a 2-dimensional CCD will be explained, with reference to FIGS. 21 and 22.

Figure 21:
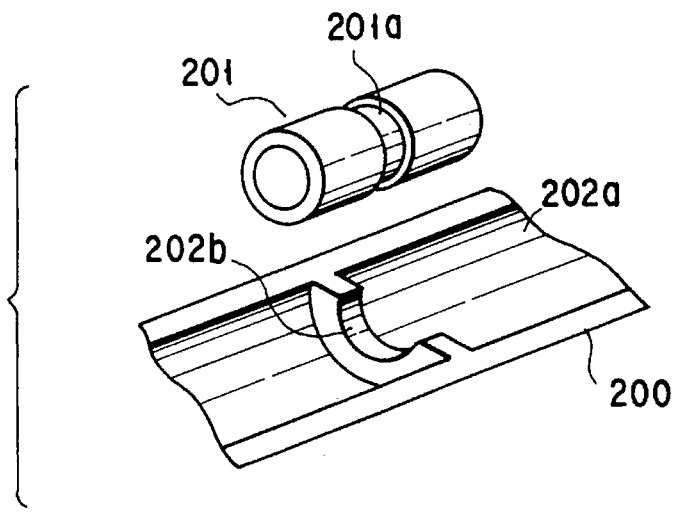
FIGS. 21 and 22 are views showing examples of a scheme for setting the position of a lens block.

In the scheme of FIG. 21, a groove 201a is formed in the outer circumferential surface of a lens block 201 comprising a lens case and grouped lenses contained in the case. More precisely, the groove 201a is formed in the outer circumferential surface of the lens case. A groove 202a and a projection 202b are formed in an optical unit (i.e., a base of an optical system) 200. The groove 202a and the projection 202b have a profile complementary to the contour of the outer circumference of the lens block 201. The lens block 201 is incorporated into the optical unit 200, such that the projection 202b fits into the groove 201a.

The projection 202b is arranged at a prescribed position with respect to the groove 202a. When the projection 202b fits into the groove 201a of the lens block 201, the lens block 201 and the area CCD are set apart from each other at a predetermined distance. In this scheme, the lens block 201 must have its outer circumferential surface shaped with high precision, and the projection 202b of the optical unit 200 must be shaped with high precision. It is also necessary to position the optical unit 200 with high precision in the 2-dimensional code scanner. Thus, unless the lens block 201 and the projection 202b are shaped precisely, or unless the optical unit 200 is positioned precisely, the 2-dimensional code scanner will fail to attain desired optical characteristics and will likely make reading errors.

Figure 22:
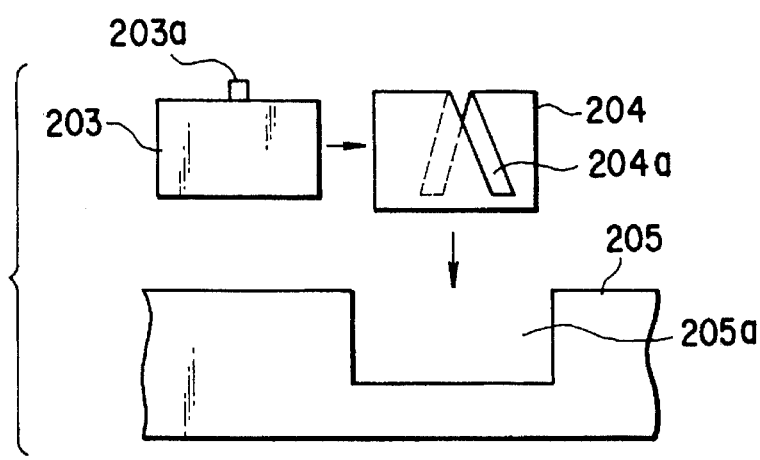

In the scheme shown in FIG. 22, a projecting knob 203a is provided on the outer circumferential surface of the lens block 203, and a helical slit 204a is made in the outer circumferential surface of a lens-holding cover 204. The lens block 203 is contained in the lens-holding cover 204, with the knob 203a protruding outside through the slit 204a. Furthermore, the cover 204 is placed in a receptacle 205a of an optical unit (i.e., a base of an optical system) 205.

The lens block 203 has its position changed as the knob 203a of the lens block 203 is moved along the slit 204a of the lens-holding cover 204. The distance between the lens block 203 and the area CCD is thereby adjusted.

In the method shown in FIG. 22, it is difficult to turn the knob 203a through a small angle to adjust the distance between the lens block 203 and the area CCD. Inevitably, the error in reading 2-dimensional codes can not be reduced sufficiently.

Figure 23:
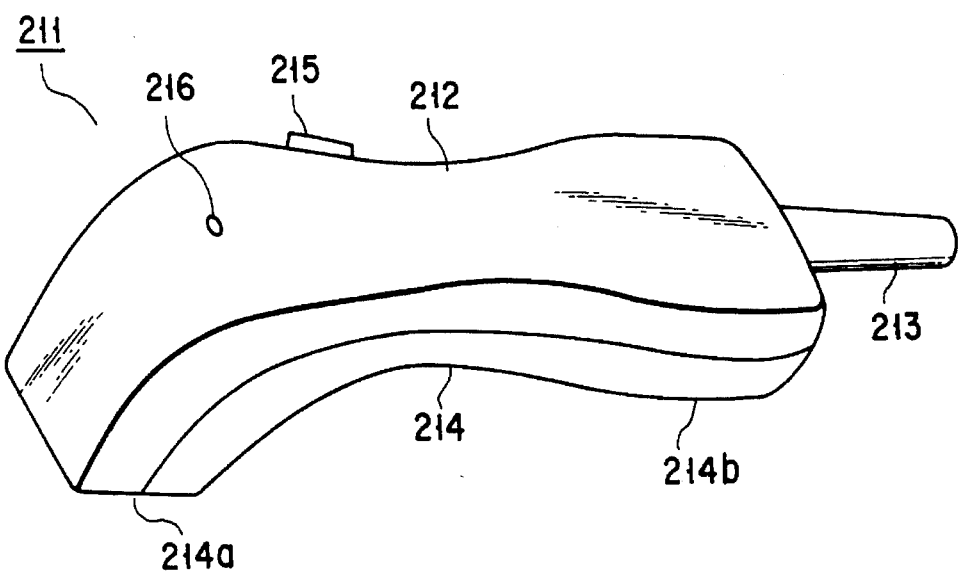
FIG. 23 is a perspective view showing a 2-dimensional code scanner according to the fourth embodiment of the present invention.

In the fourth embodiment, the 2-dimensional code scanner is arranged such that the aforementioned problems can be remedied. FIG. 23 shows the outer appearance of this 2-dimensional code scanner 211. FIG. 24 shows the internal structure of the 2-dimensional code scanner 211. Likewise the first embodiment, the 2-dimensional code scanner 211 comprises a read control circuit shown in FIG. 8 to FIG. 10, and performs a read control process shown in FIG. 11. Therefore, a description on the read control process is omitted in this embodiment.

Figure 27:
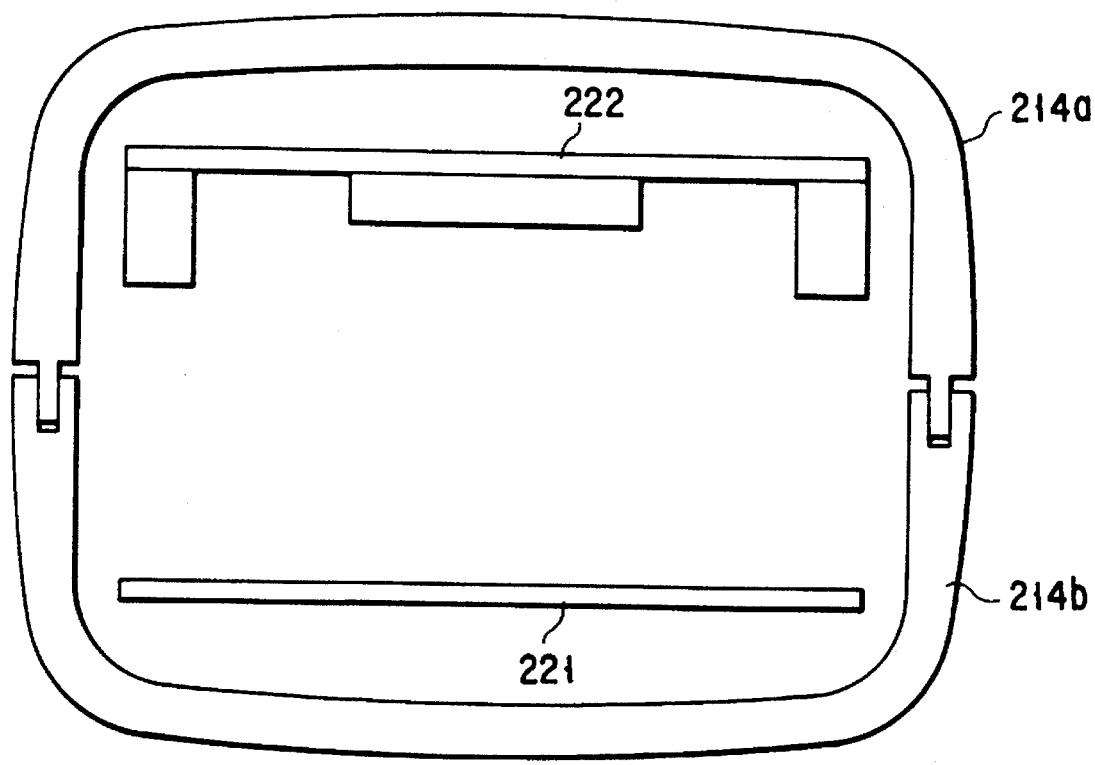
FIG. 27 is a sectional view showing the 2-dimensional code scanner in a section perpendicular to that in FIG. 24.

The 2-dimensional code scanner 211 has a plastic main frame 214 molded into the shape shown in FIG. 23. This frame 214 is composed of an upper frame 214a and a lower frame 214b which are removably fitted to each other by press fitting and screwing. As shown in FIG. 27, the matching lateral edges of the upper frame 214a have a ridge whereas those of the lower frame 214b have a corresponding groove so that, when assembled, they are engaged with each other and any external waterdrops and dust may not enter the inside through the engaging areas of the upper frame 214a and the lower frame 214b. The frame 214 has an insertion port formed in its proximal end to allow insertion of a cable 213 for connecting the 2-dimensional code scanner to an external data processing unit, e.g., a host computer. The cable 213 contains power lines and data lines, and fixed in the insertion port with a protective member of an elastic material such as rubber or synthetic resin. The elastic material is also provided to hermetically seal a read switch 215 and other components which are exposed to the outside through the frame 214, thereby preventing external waterdrops and dust from entering the inside of the scanner. The proximal-end-side of the frame 214 is used as a grip portion 212. The frame 214 is used for housing an illumination light source 217, spot-beam LEDs 218a and 218b, a deflecting mirror 220, circuit boards 221 and 222, an area CCD 223, a buzzer 224, a scanning end indicator LED 225, an optical unit 121, a transparent plate 227, an optical unit, and other components. The scanning end indicator LED 225 and the buzzer 224 are used to inform the operator of the completion of a read operation. The scanning end indicator LED 225 is exposed from a indicator window 216 which is disposed to close an opening formed in the upper frame 214a and made of highly transmissive transparent plastic material. The frame 103 has a 2-dimensional code read window 214c on its distal end. An axis perpendicular to a read window plane is set at an angle of at least 90 degrees or more with respect to the central axis of the grip portion 212. The transparent plate 227 is made of highly transmissive transparent plastic material, and disposed inside the read window 214c to block external waterdrops and dust.

The illumination light source 217 is secured to the frame 214 and located adjacent to the transparent plate 227, in order to illuminate the whole 2-dimensional code. The light source 217 comprises a plurality of LEDs arranged in a horizontal row, for emitting illumination light onto the 2-dimensional code and plastic diffusion lenses for uniformly diffusing the light emitted from the LEDs. The light source 217 is so positioned as to apply illumination light outside through the whole read window 214c. The spot-beam LED 218a and the spot-beam LED 218b are fixed to a U-shaped plate 219 secured to the inner side of the transparent plate 227. As shown in FIG. 25, these LEDs 218a and 218b are positioned symmetrically to each other. The LEDs 218a and 218b are inclined such that the light beams emitted from them intersect with each other at a distance 20 mm along a vertical axis passing through the center of the read window 214c (namely, at a distance of 10 mm from the read window 214c), thereby to form one beam spot on the label placed at that distance. Both spot-beam LEDs 218a and 218b are turned on prior to the reading of a 2-dimensional code and turned off when the illumination light source 217 is turned on.

The deflecting mirror 220 is disposed nearer to the proximal end than the illumination light source 217 and is set at a predetermined angle with respect to the read window plane such that incident light which comes from the 2-dimensional code via the read window 214c is reflected toward the area CCD 223. The optical unit is composed of a filter (not shown) and a lens block 226. The filter is used to attenuate unnecessary external light. The lens block 226 is arranged along the optical axis connecting the deflecting mirror 220 and the area CCD 223, and focuses the reflected light from the deflecting mirror 220 to the light-receiving surface of the area CCD 223 to form an image. The lens block 226 is constituted by an aperture mechanism and grouped lenses 23b (not shown). The area CCD 223 is a solid-state image sensor for sensing the image formed through the lens block 226 and converting it into an electrical signal. The area CCD 223 has a large number of photo elements arranged in a matrix form on the light-receiving surface. The number of effective photo elements is set to be at least 250,000. (When a high-density 2-dimensional code is to be read, the number of effective photo elements of the area CCD 223 is preferably increased to 400,000 or more. Further, antireflection coat is performed on the grouped lenses to prevent a ghost image from being formed due to surface reflection. In place of the grouped lenses, an aspherical lens may be used to suppress the distortion of an image on the light-receiving surface of the area CCD 223.)

The position of the lens block 226 is determined such that when the 2-dimensional code is set at a distance of 10 mm or less from the read window 214c, an image having a proper contrast for digitalization can be formed on the light-receiving surface of the area CCD 223. The circuit boards 221 and 222 is a video signal processing board and a code image processing board each of which has various electronic parts mounted on one or both surfaces. These electronic parts constitute the read control circuit together with the area CCD 223. This read control circuit is electrically connected to the illumination light source 217, the spot-beam LEDs 218a and 218b, the scanning end indicator LED 225, the read switch 215, and the buzzer 224. In FIG. 24, 116, 117, and 118 denote a DC-DC converter, a CPU, and a ROM, respectively.

A description will now be given of a structure for positioning the lens block 226.

The lens block 226 comprises a cylindrical case and grouped lenses contained inside the case. As shown in FIG. 26, the lens block 226 has an engaging groove 226a formed in the outer circumference thereof. The lens block 226 is slidably coupled to an optical system base 231 by means of a lens holding cover 233. The optical system base 231 has a slide groove 231a corresponding in shape to the outer circumference of the lens block 226. The lens holding cover 233 is formed by the press-working of a metal plate, and has a curved portion corresponding in shape to the outer circumference of the lens block 226, and two slits 233a and 233b formed in the curved portion and extending in the direction of the optical axis of the lens block 226. The lens block 226 is fitted in the slide groove 31a, surrounded by the lens holding cover 233, and pressed against the slide groove 231a when the lens holding cover 233 is engaged and connected by means of two screws 232a and 232b.

Figure 28:
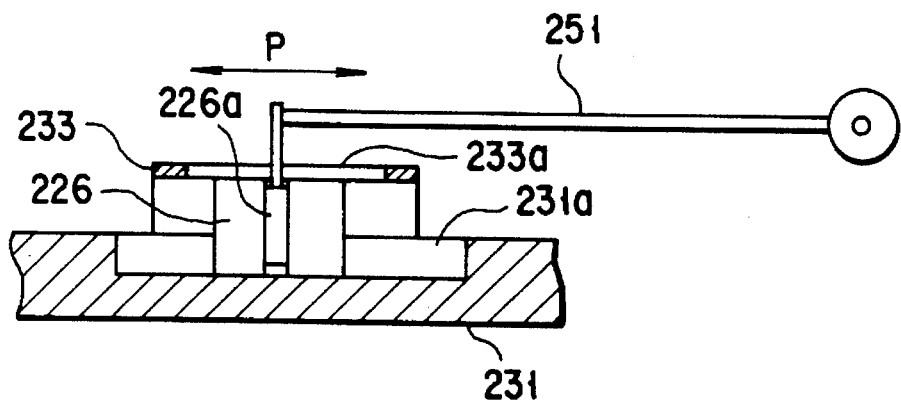
FIG. 28 is a view illustrating how the lens block is positionally regulated.

The position of the lens block 226 is regulated by means of a lens block position-regulating jig (which incorporates a micrometer therein) and a monitor display for displaying a read image. To regulate the position of the lens block 226, the upper frame 214a is removed from the 2-dimensional code scanner 211, and in this state the 2-dimensional code scanner is fixed to the XY table together with the lens block position-regulating jig. Subsequently, the monitor display is connected to a video signal processing circuit so that the monitor display can be supplied with a video signal. Thereafter, the engaging portion 251 of the lens block position-regulating jig is made to pass through one of the slits 233a and 233b of the lens holding cover 233 and brought into engagement with the engaging groove 226a of the lens block 226, by adjusting the micrometer connected to the engaging portion 251 of the lens block position-regulating jig. As a result, the lens block 226 becomes movable in the direction indicated by arrow P in FIG. 28. Further, the screws 232a and 232b are loosened to the same degree, a test sheet on which a test graphic pattern is printed is pasted to the reading window 214c, and the 2-dimensional code scanner 211 and the engaging portion 251 of the lens block position-regulating jig are covered with a light-shielding member, such as black cloth. Then, the monitor display is turned on to display an image of the test graphic pattern.

When the micrometer incorporated in the lens block position-regulating jig is adjusted, the lens block 226 is moved along the slide groove 231a, i.e., in the direction indicated by arrow P, and an image which varies in quality in accordance with the movement of the lens block 226 is displayed on the monitor display. While looking at the monitor display, the operator uniformly tightens the screw 232a and 232b at the point of time when the quality of the image shown on the monitor display is optimal. In this manner, the lens block 226 is fixed at the position where it produces an optimal image quality. After the lens block 226 is positioned, the light-shielding member is removed, the engaging portion 251 of the lens block position-regulating jig is disconnected from the engaging groove 226a of the lens block 226, and the upper frame 214a and the lower frame 214b are coupled together by means of screws.

Since, as described above, the position of the lens block can be regulated by use of the lens block position-regulating jig, it can be regulated with such high accuracy as corresponds to the resolution of the micrometer of the lens block position-regulating jig. For example, in the case where a micrometer whose minimum scale corresponds to 0.01 mm is connected directly to the engaging portion 251, the position of the lens block can be regulated in units of 0.01 mm.

In the 2-dimensional code scanner employed in this embodiment, the two spot beams emitted by the spot beam LEDs 218a and 218b fall on a label when the reading window 214c is set close to the 2-dimensional code printed on the label. Therefore, the operator can place the reading window 214c on the label so that the center of the 2-dimensional code printed on the label is at the center of the reading area defined by the spot beams. When the reading switch 215 is depressed, with the reading window 214c placed on the label, the spot beam LEDs 218a and 218b are turned off. At the time, the illuminating light source 217 is turned on, and the 2-dimensional code is read in a similar manner to that of the first embodiment.

In this embodiment, the position of the focal point need not be adjusted, and the aperture needs not be adjusted in accordance with a change in the intensity of the light with which the printing medium is irradiated. Since the reading operation is automatically started by merely depressing the reading switch 215, the 2-dimensional code can be easily read in a short time.

In the embodiment, the lens block 226 is slidably coupled to the optical system base 231 by means of the lens holding cover 233. The lens block position-regulating jig comprises an engaging portion 251 which is made to pass through either slit 233a or 233b of the lens holding cover 233 and which is engaged with the engaging groove 226a of the lens block 226, and the position of the lens block 226 can be regulated in accordance with the adjustment made to the micrometer coupled to the engaging portion 251. Therefore, the position of the lens block 226 can be regulated easily and accurately, with the image on the monitor display being observed. Thus, the position of the lens block 226 can be regulated in a short time after the replacement of the lens block 226.

In the embodiment, the coupling portions of the upper and lower frames 214a and 214b have convex and concave shapes, respectively, and the upper and lower frames 214a and 214b are coupled together by means of screws. Although the reading switch 215 and other members penetrate the frame 214, the gaps between such members and the frame 214 are filled with an elastic material, such as rubber. In addition, a transparent plate is disposed inside the reading window 214c. with this structure, water, dust, etc. are prevented from entering the internal space of the 2-dimensional code scanner 211, thus suppressing the occurrence of a malfunction or breakdown of the 2-dimensional code scanner 211.

Figure 29:
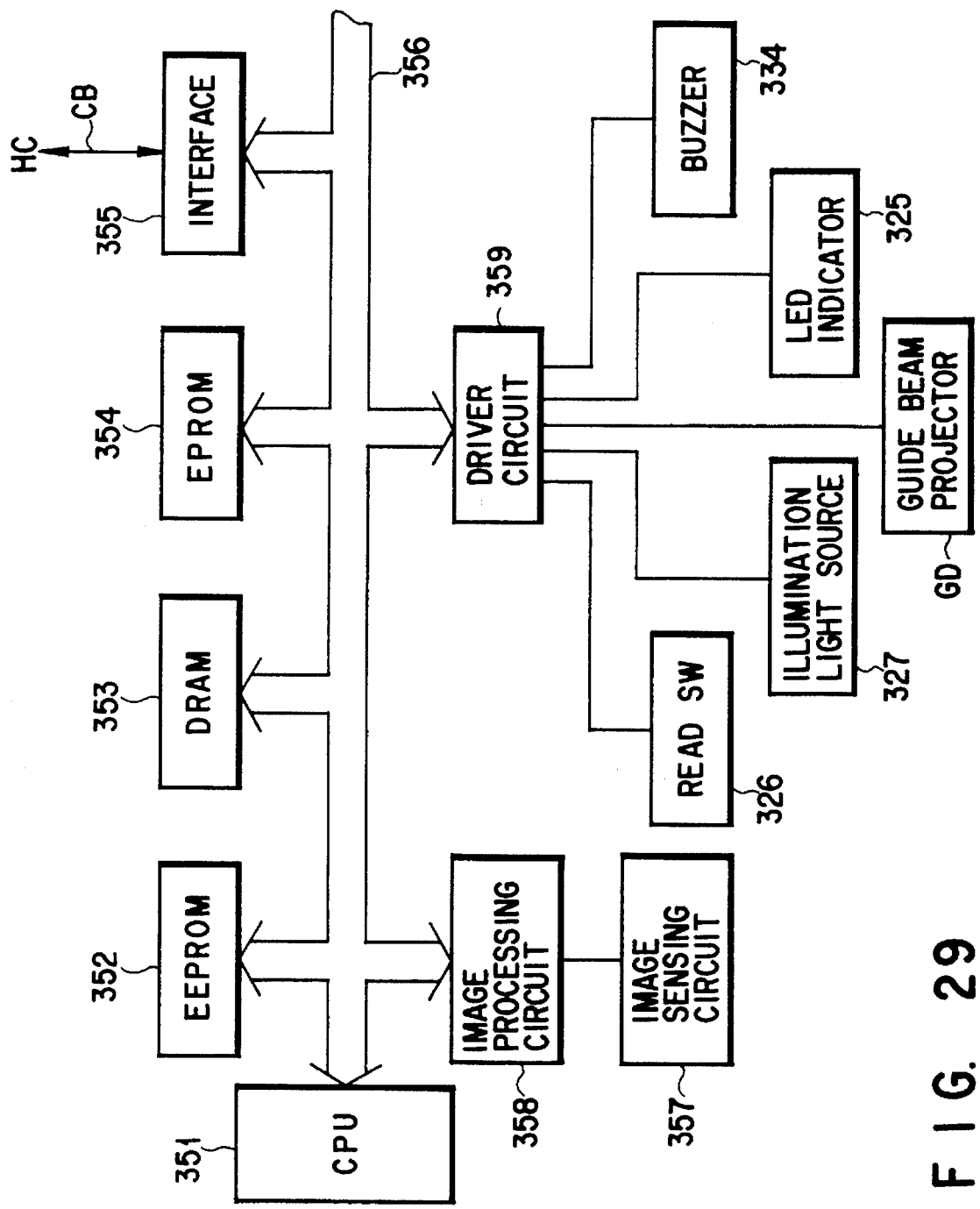
FIG. 29 is a block diagram showing a modification of a read control circuit of the 2-dimensional code scanner each embodiment.

In each embodiment, the read control circuit may be modified as shown in FIG. 29.

The read control circuit includes a CPU 351, an EEPROM 352, a DRAM 353, an EPROM 354, an input/output (I/O) interface 355, a bus line 356, an image sensing circuit 357, an image processing circuit 358, and a driver circuit 359. The CPU 351 is connected to the EEPROM 352, the DRAM 353, the EPROM 354, the input/output (I/O) interface 355, the image processing circuit 358, and the driver circuit 359 via the bus line 356. The image processing circuit 358 is connected to the image sensing circuit 357 incorporating the area CCD 330. The driver circuit 359 is connected to an LED indicator 325, a read switch 326, an illumination light source 327, a buzzer 336, and a guide beam projector GD. The interface 355 is connected to a host computer HC via a cable CB. The CPU 351 performs a read control process of controlling the above-described various components to read a 2-dimensional code. The EEPROM 352 stores a control program for the read control process and initial setup data. The DRAM 353 temporarily stores various data. A plurality of memory areas are set in the DRAM 353 to store various data in the above read control process. The EPROM 354 stores conversion data for a decode processing of converting the black/white array data of a 2-dimensional code into article information. The interface 355 serves to communicate with the host computer HC via the cable CB. The image sensing circuit 57 detects an image formed on the area CCD 330, and outputs the image as an analog video signal. The image processing circuit 358 performs an image processing of converting the analog video signal output from the image sensing circuit 357 into dot matrix image data, distinguishing a 2-dimensional code part from the background thereof in the image data, and producing black/white array data representing black and white sections arrayed in the 2-dimensional code part. This array data is converted into article information by the decode processing. The driver circuit 59 drives the LED indicator 325, the read switch 326, the illumination light source 327, the buzzer 336, and the guide beam projector GD under the control of the CPU 351.

FIG. 30 shows the image sensing circuit 357 and the image processing circuit 358 in more detail.

The image sensing circuit 357 is constituted by the area CCD 330, a video signal processing circuit 357A, a sync signal generator 357B, a timing generator 357C, a vertical driver 357E, and a horizontal driver 357F. In the area CCD 330, the respective photo elements generate charges in accordance with incident light, and the charges are transferred, as charge packets, to a charge detecting section. The charge detecting section generates an analog video signal in accordance with the charge amount of each charge packet. The sync signal generator 57B generates a sync signal serving as a reference clock for operating the area CCD 330. The timing generator 57C generates vertical and horizontal transfer timings of the charge packets synchronized with the reference clock from the sync signal generator 357B. The vertical and horizontal drivers 357E and 357F shift the charge packets in the column and row directions at the vertical and horizontal transfer timings, respectively. The signal processing circuit 357A amplifies the analog video signal output from the area CCD 330, and samples/holds a signal level in synchronism with the transfer timings, thereby wave-shaping the video signal.

The image processing circuit 358 includes an amplifier 358A, an A/D converter 358B, a frame memory 358C, and an image data processing circuit 358D. The amplifier 358A amplifies a video signal supplied from the signal processing circuit 357A, and supplies the signal to the A/D converter 358B. The A/D converter 358B performs an analog-to-digital conversion in which the amplified video signal is converted into digital data to be supplied to the frame memory 358C. The frame memory 358C has memory cells corresponding to the size of an image detected by the area CCD 330. A series of digital data supplied from the A/D converter 358B is stored in the frame memory 358C, as dot matrix image data. The image data processing circuit 358D performs a density correction and emphasis processing on the dot matrix image data stored in the frame memory 358C to distinguishes a 2-dimensional code part from the background thereof in the dot matrix image data, and performs a rotation and feature extraction processing on the image data of the 2-dimensional code part to produce black/white array data representing black and white sections arrayed in the 2-dimensional code part.

The CPU 351 obtains article information by performing a decode processing on the black/white array data supplied from the image data processing circuit 358D, and supplies the article information to the host computer HC via the interface 355.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical code reader which is held in a hand of an operator and which is brought near an article having a 2-dimensional code affixed thereto at the time of reading, the optical code reader comprising:

light source means for illuminating the 2-dimensional code on the article;

reading means for reading the 2-dimensional code from a light reflected by the article; and a frame member for housing said light source means and said reading means, said frame member having a read window which defines a reading area viewed by said reading means;

wherein said reading means includes:

an image sensor for sensing an image formed thereon and converting the image to an electrical signal;

a lens block having an optical lens system for focusing the reflected light received via said read window to form the image on said image sensor, an optical path between said read window and said optical lens system having an optimum length determined according to a magnification of the optical lens system; and mounting means for removably mounting on said frame member said lens block and an attachment cap which is optionally provided and which has an opening serving as said read window.

2. An optical code reader according to claim 1, wherein said attachment cap is provided, and has a height which is preset according to the optimum length of said optical path.

3. An optical code reader according to claim 2, wherein said attachment cap is elongatable so as to vary the height thereof.

4. An optical code reader according to claim 1, wherein said frame member includes an opening through which said lens block is accessed for replacement.

5. An optical code reader according to claim 1, wherein said lens block further includes a lens holder for holding said optical lens system at a position which is preset for obtaining an optimum length of said optical path.

6. An optical code reader according to claim 1, wherein said read window has a size which is substantially equal to a length of the 2-dimensional code.

7. An optical code reader according to claim 6, wherein said read window has a rectangular form.

8. An optical code reader according to claim 6, wherein said attachment cap is provided and has a thickness which gradually decreases towards said read window.

9. An optical code reader according to claim 6, wherein said attachment cap is provided and further has a plurality of marks indicating midpoints of the reading area in span and height directions of the 2-dimensional code.

10. An optical code reader according to claim 9, wherein each mark comprises a vertically formed rib on an outer side of said attachment cap.

11. An optical code reader according to claim 1, wherein:

said lens block further includes a groove formed in an outer circumference of said optical lens system, and a lens holder for holding said optical lens system at a position which is preset according to an optimum length of said optical path;

said lens holder comprises a supporting member for supporting said optical lens system so that said optical system is slidable in a direction of an optical axis thereof, a cover which covers said optical lens system, and fixing means for fixing said cover to said supporting member; and said cover has a slit therein for allowing said optical lens system to be moved in the direction of said optical axis by an engaging portion of an external device which is engaged with said groove exposed through said slit.

12. An optical code reader according to claim 1, wherein said light source means includes a spot-beam light source for emitting a plurality of spot-beams which pass through said read window and intersect at a predetermined distance from said read window.

* * * * *